United States Patent
Grobelny et al.

(10) Patent No.: US 12,210,643 B2
(45) Date of Patent: Jan. 28, 2025

(54) SYSTEMS AND METHODS FOR SUBORDINATE WORKSPACES

(71) Applicant: Dell Products, L.P., Round Rock, TX (US)

(72) Inventors: Nicholas D. Grobelny, Evergreen, CO (US); Girish S. Dhoble, Austin, TX (US); Jason Kolodziej, Rowlett, TX (US)

(73) Assignee: Dell Products, L.P., Round Rock, TX (US)

( * ) Notice: Subject to any disclaimer, the term of this patent is extended or adjusted under 35 U.S.C. 154(b) by 217 days.

(21) Appl. No.: 18/157,096

(22) Filed: Jan. 20, 2023

(65) Prior Publication Data

US 2024/0249010 A1 Jul. 25, 2024

(51) Int. Cl.
*G06F 21/62* (2013.01)
*G06F 21/54* (2013.01)
*G06F 21/57* (2013.01)

(52) U.S. Cl.
CPC .......... *G06F 21/6218* (2013.01); *G06F 21/54* (2013.01); *G06F 21/577* (2013.01)

(58) Field of Classification Search
None
See application file for complete search history.

(56) References Cited

U.S. PATENT DOCUMENTS

| | | | |
|---|---|---|---|
| 11,190,569 B2* | 11/2021 | Yu | H04L 61/5007 |
| 11,334,675 B2* | 5/2022 | Andrews | H04L 47/781 |
| 11,977,898 B2* | 5/2024 | Rajagopalan | G06F 9/4411 |
| 11,983,123 B2* | 5/2024 | Thiruchengode Vajravel | G06F 13/10 |
| 2021/0133336 A1* | 5/2021 | Andrews | G06F 21/602 |
| 2023/0259472 A1* | 8/2023 | Azam | G06F 9/4411 710/113 |
| 2024/0241838 A1* | 7/2024 | Andrews | G06F 9/4411 |
| 2024/0242138 A1* | 7/2024 | Dhoble | G06F 11/3051 |
| 2024/0248698 A1* | 7/2024 | Andrews | G06F 13/102 |
| 2024/0249010 A1* | 7/2024 | Grobelny | G06F 21/6218 |
| 2024/0250947 A1* | 7/2024 | Grobelny | H04L 63/08 |
| 2024/0250953 A1* | 7/2024 | Robison | H04L 63/105 |
| 2024/0264960 A1* | 8/2024 | Vajravel | G06F 13/362 |

* cited by examiner

*Primary Examiner* — Backhean Tiv
(74) *Attorney, Agent, or Firm* — Fogarty LLP

(57) ABSTRACT

Systems and methods support operation of primary on an Information Handling System (IHS) and the operation of subordinate workspaces on peripheral devices coupled to the IHS. The IHS receives a primary workspace definition from a remote orchestrator and instantiates a primary workspace based upon the primary workspace definition, where the instantiated primary workspace operates using core resources of the IHS and provides access to a protected resource. The IHS reports, to the remote orchestrator, an inventory of peripheral devices that are detected as coupled to the IHS. In response, one or more subordinate workspace definitions are received from the remote orchestrator, where each of the subordinate workspace definitions are for operation of a subordinate workspace by one of the peripheral devices coupled to the IHS. Based on the received subordinate workspace definitions, operation of subordinate workspaces is initiated on peripheral devices coupled to the IHS.

20 Claims, 7 Drawing Sheets

SYSTEMS AND METHODS FOR SUBORDINATE WORKSPACES

FIELD

This disclosure relates generally to Information Handling Systems (IHSs), and, more specifically, to workspaces operating on IHSs.

BACKGROUND

As the value and use of information continues to increase, individuals and businesses seek additional ways to process and store it. One option available to users is an Information Handling System (IHS). An IHS generally processes, compiles, stores, and/or communicates information or data for business, personal, or other purposes thereby allowing users to take advantage of the value of the information. Because technology and information handling needs and requirements vary between different users or applications, IHSs may also vary regarding what information is handled, how the information is handled, how much information is processed, stored, or communicated, and how quickly and efficiently the information may be processed, stored, or communicated. Variations in IHSs allow for IHSs to be general or configured for a specific user or specific use such as financial transaction processing, airline reservations, enterprise data storage, or global communications. In addition, IHSs may include a variety of hardware and software components that may be configured to process, store, and communicate information and may include one or more computer systems, data storage systems, and networking systems.

Once an IHS has been delivered and deployed, malicious actors may seek to gain access to the IHS. Upon gaining such access to the IHS, a malicious actor may attempt to download protected data from the IHS, such as downloading trade secrets, personal information and financial information from the IHS. A malicious actor may also attempt to upload data to a compromised IHS, such as uploading malicious instructions that provide the malicious actor with at least some control of the IHS. Malicious actors may attempt to gain access to an IHS via a wide variety of entry points. The set of possible entry points for gaining access to an IHS or disabling an IHS may be referred to as the attack surface of the IHS.

Organizations may own and/or manage large numbers of IHSs. For instance, an employer may provide laptop computers to employees and may also operate various other types of IHSs, such as rack-mounted servers and networking equipment, in order to support operation of the laptops. The provided laptops may be operated in a variety of scenarios, both for performing job functions and for personal use. In another example, educational institutions may support various types of IHSs, such as tablets and laptops, that are issued to students and employees. Medical institutions may also support a variety of IHSs that may be used by patients, visitors and/or staff. In all such instances, the users and IHSs that are being supported is continually in flux.

Many IHSs, such as laptops and tablets, are portable and are commonly used in different locations, even if different locations within a single building or residence. Portable IHSs may be used in public locations, and may thus be regularly used in a variety of different public and private locations. Based on such changes in location, an IHS may be coupled to different external devices, such as a laptop being docked at different workstations. In some instances, the external devices that may be occasionally connected to an IHS may include both public and private devices, such as use of an IHS while coupled to a home office workstation and use of the IHS at an airport, hotel, or corporate shared-use workstation. Organizations seeking to provide IHS users with access protected data must be prepared to do so in a wide variety of operational scenarios.

SUMMARY

In various embodiments, Information Handling Systems (IHSs) may include: a processor; and a memory coupled to the processor, the memory having program instructions stored thereon that, upon execution, cause the processor to: receive a primary workspace definition from a remote orchestrator; instantiate a primary workspace based upon the primary workspace definition, wherein the instantiated primary workspace provides access to a protected resource; report, to the remote orchestrator, an inventory of peripheral devices that are coupled to the IHS; receive a plurality of subordinate workspace definitions from the remote orchestrator, wherein each of the subordinate workspace definitions are for operation of a subordinate workspace by one of the peripheral devices coupled to the IHS; and based on the received subordinate workspace definitions, initiate operation of a plurality of subordinate workspaces on peripheral devices coupled to the IHS.

In some IHS embodiments, the primary workspace is instantiated to operate using one or more CPUs and system memory of the IHS. In some IHS embodiments, upon being initiated, each of the subordinate workspaces are instantiated for operation using logic and memory resources of a respective peripheral device. In some IHS embodiments, each of the subordinate workspace definitions specify restrictions on the operation of a respective peripheral device that is coupled to the IHS. In some IHS embodiments, the restrictions prohibit operations by a peripheral device with respect to the protected data. In some IHS embodiments, the restrictions prohibit a peripheral device from modifying the protected data. In some IHS embodiments, the restrictions prohibit a peripheral device from accessing the protected data. In some IHS embodiments, the restrictions prohibit a peripheral device from operations other than display of the protected data. In some IHS embodiments, the restrictions specify allowed communications by a peripheral device with the primary workspace. In some IHS embodiments, the allowed communications are specified by an API of supported communications between a peripheral device and the primary workspace. In some IHS embodiments, the restrictions on the operation of a respective peripheral device are selected based on a security score of the peripheral device. In some IHS embodiments, the restrictions prohibited all communications between a first peripheral device and the primary workspace based on a security score above a threshold for the first peripheral device. In some IHS embodiments, initiating operation of the plurality subordinate workspaces on peripheral devices coupled to the IHS modifies a security score of the primary workspace.

In various additional embodiments, methods support workspaces on an Information Handling System (IHS). The methods may include: receiving a primary workspace definition from a remote orchestrator; instantiating a primary workspace on the IHS based upon the primary workspace definition, wherein the instantiated primary workspace provides access to a protected resource; reporting, to the remote orchestrator, an inventory of peripheral devices that are coupled to the IHS; receiving a plurality of subordinate workspace definitions from the remote orchestrator, wherein each of the subordinate workspace definitions are for operation of a subordinate workspace by one of the peripheral devices coupled to the IHS; and based on the received subordinate workspace definitions, initiating operation of a plurality of subordinate workspaces on peripheral devices coupled to the IHS.

In some method embodiments, the primary workspace is instantiated to operate using one or more CPUs and system memory of the IHS. In some method embodiments, upon being initiated, each of the subordinate workspaces are instantiated for operation using logic and memory resources of a respective peripheral device. In some method embodiments, each of the subordinate workspace definitions specify restrictions on the operation of a respective peripheral device that is coupled to the IHS. In some method embodiments, the restrictions prohibit operations by a peripheral device with respect to the protected data. In some method embodiments, the restrictions specify allowed communications by a peripheral device with the primary workspace.

In various additional embodiments, memory storage devices include program instructions stored thereon that, upon execution by an Information Handling System (IHS), cause the IHS to: receive a primary workspace definition from a remote orchestrator; instantiate a primary workspace based upon the primary workspace definition, wherein the instantiated primary workspace provides access to a protected resource; report, to the remote orchestrator, an inventory of peripheral devices that are coupled to the IHS; receive a plurality of subordinate workspace definitions from the remote orchestrator, wherein each of the subordinate workspace definitions are for operation of a subordinate workspace by one of the peripheral devices coupled to the IHS; and based on the received subordinate workspace definitions, initiate operation of a plurality of subordinate workspaces on peripheral devices coupled to the IHS.

BRIEF DESCRIPTION OF THE DRAWINGS

The present invention(s) is/are illustrated by way of example and is/are not limited by the accompanying figures, in which like references indicate similar elements. Elements in the figures are illustrated for simplicity and clarity and have not necessarily been drawn to scale.

DETAILED DESCRIPTION

Figure 1:
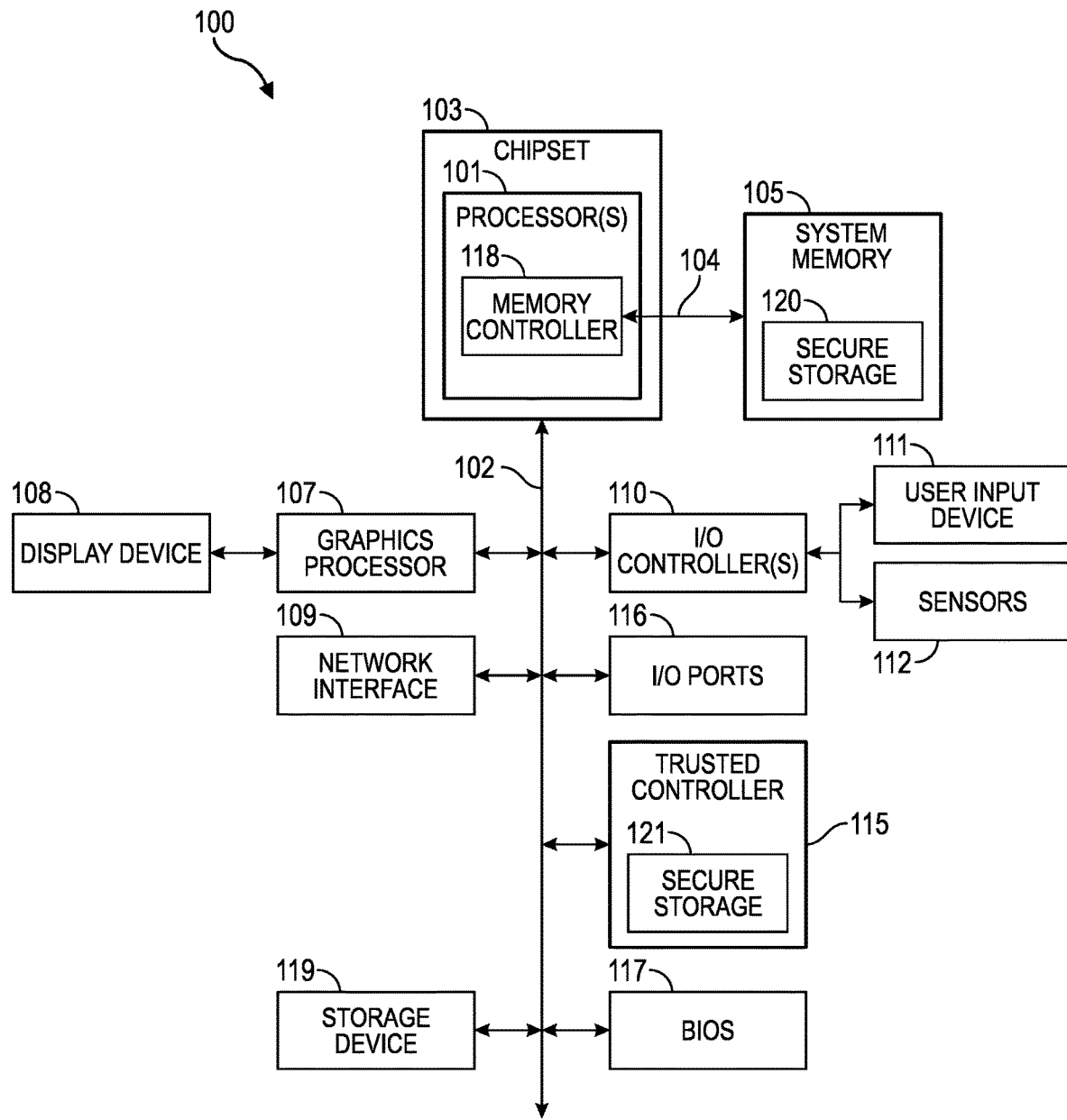
FIG. 1 is a diagram depicting illustrative components of an Information Handling System (IHS) configured, according to various embodiments, to support workspaces operating on the IHS.

For purposes of this disclosure, an IHS may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an IHS may be a personal computer (e.g., desktop or laptop), tablet computer, mobile device (e.g., Personal Digital Assistant (PDA) or smart phone), server (e.g., blade server or rack server), a network storage device, or any other suitable device and may vary in size, shape, performance, functionality, and price. An example of an IHS is described in more detail below. FIG. 1 shows various internal components of an IHS configured to implement certain of the described embodiments. It should be appreciated that although certain embodiments described herein may be discussed in the context of a personal computing device, such as laptop computers, other embodiments may utilize various other types of IHSs, such as rack-mounted servers.

FIG. 1 is a diagram depicting illustrative components of an Information Handling System (IHS) 100 configured, according to various embodiments, to support workspaces operating on the IHS. In some embodiments, IHS 100 may be employed to instantiate, manage, and/or terminate a workspace, such as a secure environment that may provide the user of IHS 100 with access to enterprise data while isolating the enterprise data from an Operating System (OS) and/or other applications executed by IHS 100. A workspace may operate using a variety of different configurations of the hardware and software resources of the IHS 100, where the resources that are used may be selected based on the security and risk context of a request to access protected data. As described in additional detail below, a primary workspace and one or more subordinate workspaces may operate on an IHS 100, such that a variety workspace topologies may be supported using the available computing resources of the IHS 100, including computing resources of external devices coupled to the IHS. Based on the current risk and security context in which an IHS 100 is operating, embodiments may switch between use of different workspace topologies that are supported by an IHS.

As shown in FIG. 1, IHS 100 includes one or more processor(s) 101, such as a Central Processing Unit (CPU), operable to execute code retrieved from system memory 105. Although IHS 100 is illustrated with a single processor, other embodiments may include two or more processors, that may each be configured identically, or to provide specialized processing functions. Processor(s) 101 may include any processor capable of executing program instructions, such as an INTEL PENTIUM series processor or any general-purpose or embedded processors implementing any of a variety of Instruction Set Architectures (ISAs), such as the x86, POWERPC®, ARM®, SPARC®, or MIPS® ISAs. In the embodiment of FIG. 1, processor(s) 101 includes an integrated memory controller 118 that may be implemented directly within the circuitry of processor(s) 101, or memory controller 118 may be a separate integrated circuit that is located on the same die as processor(s) 101. Memory controller 118 may be configured to manage the transfer of data to and from system memory 105 of IHS 100 via high-speed memory interface 104.

System memory 105 that is coupled to processor(s) 101 via memory bus 104 provides processor(s) 101 with a high-speed memory that may be used in the execution of computer program instructions by processor(s) 101. Accordingly, system memory 105 may include memory components, such as such as static RAM (SRAM), dynamic RAM (DRAM), NAND Flash memory, suitable for supporting high-speed memory operations by processor(s) 101. In some embodiments, system memory 105 may combine both persistent, non-volatile memory and volatile memory.

In certain embodiments, system memory 105 includes secure storage 120 that may be a segregated and protected portion of the system memory designated for storage of information, such as access policies, component signatures, encryption keys, and other cryptographic information, for use in hosting a secure workspace on IHS 100. In such embodiments, a signature may be calculated based on the contents of secure storage 120 and stored as a reference signature. The integrity of the data stored in secure storage 120 may then be validated at a later time by recalculating this signature of the contents of the secure storage and comparing the recalculated signature against the reference signature.

IHS 100 utilizes chipset 103 that may include one or more integrated circuits that are coupled to processor(s) 101. In the embodiment of FIG. 1, processor(s) 101 is depicted as a component of chipset 103. In other embodiments, all of chipset 103, or portions of chipset 108 may be implemented directly within the integrated circuitry of processor(s) 101. Chipset 103 provides processor(s) 101 with access to a variety of resources accessible via bus 102. In IHS 100, bus 102 is illustrated as a single element. However, other implementations may utilize any number of buses to provide the illustrated pathways served by bus 102.

As illustrated, a variety of resources may be coupled to processor(s) 101 of IHS 100 through chipset 103. For instance, chipset 103 may be coupled to network interface 109, such as provided by a Network Interface Controller (NIC) that is coupled to IHS 100 and allows IHS 100 to communicate via a network, such as the Internet or a LAN. Network interface device 109 may provide IHS 100 with wired and/or wireless network connections via a variety of network technologies, such as wireless cellular or mobile networks (CDMA, TDMA, LTE etc.), WIFI and BLUETOOTH. As described in additional detail below, in certain embodiments, network interface 109 may support connections between a trusted IHS component, such as trusted controller 115, and a remote orchestration service. In such embodiments, a connection supported by network interface 109 between the remote orchestration service and the trusted component may be considered an out-of-band (OOB) connection that is isolated from the OS of the IHS. In some embodiments, an OOB connection supported by network interface 109 may support a variety of remote management operations by trusted controller 115, including providing remote management of IHS 100 and/or of hardware components installed in IHS 100. As described in additional detail below, embodiments of IHS 100 may utilize OOB connections to interface with multiple remote orchestration services that may each provide different types of support for workspaces operating on IHS 100.

Chipset 102 of IHS 100 may also provide access to one or more display device(s) 108 via graphics processor 107. In certain embodiments, graphics processor 107 may be comprised within one or more video or graphics cards or an embedded controller installed as components of IHS 100. Graphics processor 107 may generate display information and provide the generated information to one or more display device(s) 108 coupled to IHS 100, where display device(s) 108 may include integrated display devices and/or external display devices 120G coupled to IHS, such as via an I/O port 116, where display device(s) 108 may include integrated display devices and/or external display devices coupled to IHS. In certain embodiments, graphics processor 107 may be integrated within processor 101. The one or more display devices 108 coupled to IHS 100 may utilize LCD, LED, OLED, or other thin film display technologies. Each display device 108 may be capable of touch input such as via a touch controller that may be an embedded component of display device 108, graphics processor 107, or a separate component of IHS 100 accessed via bus 102. In some embodiments, an external display device 120G coupled to IHS may include discrete logic and memory resources that may be used in the operation of a subordinate workspace. As described in additional detail below, in embodiments, a subordinate workspace may operate using the resources of display device 120G and may operate based on a subordinate workspace definition and through orchestration by a primary workspace operating on core resources of IHS 100, such as CPU 101 and system memory 105. In some scenarios, an external display device 120G coupled to IHS 100 may be a public or shared-use display monitor, such as provided to the user of IHS 100 via a shared or public workstation.

In certain embodiments, chipset 103 may utilize one or more I/O controllers 110 to access hardware components such as user input devices 111 and sensors 112. For instance, I/O controller 110 may provide access to user-input devices 111 such as a keyboard 120B, mouse 120D, touchpad, touchscreen and/or other peripheral input devices. User input devices 111 may interface with I/O controller 110 through wired or wireless connections. In some embodiments, any or all of the user-input devices 111 coupled to IHS may be discrete devices with their own logic and memory resources that may be used in the operation of a workspace. As described in additional detail below, a subordinate workspace may operate using the resources of such user-input devices 111 and may operate based on a subordinate workspace definition through orchestration provided by a primary workspace that operates on core resources of IHS 100. In some scenarios, user-input devices 111 coupled to IHS 100 may be a public or shared-use devices, such as a keyboard 120B and mouse 120D of a shared or public workstation.

Figure 2A:
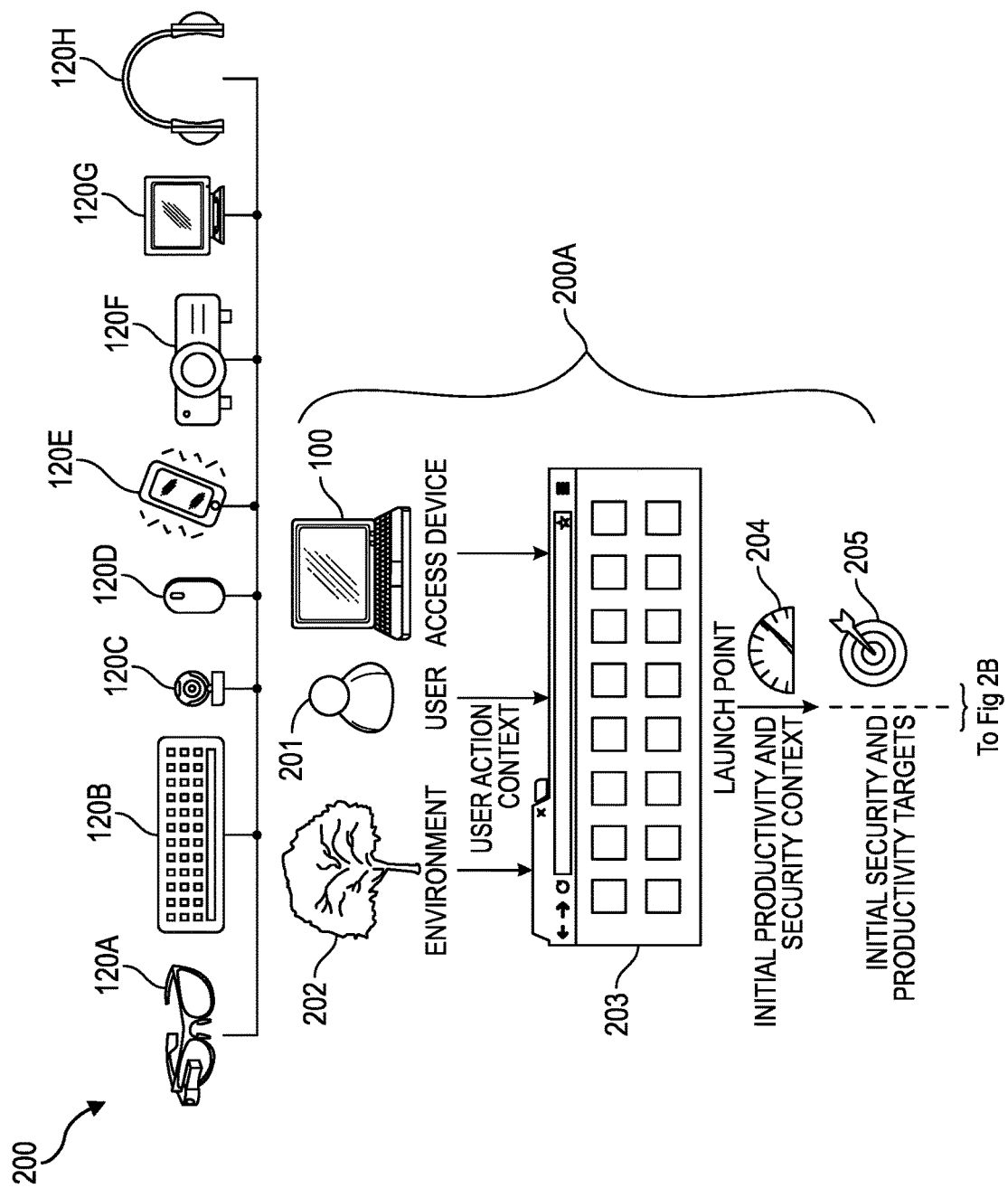
FIGS. 2A and 2B are a diagram depicting a method, according to various embodiments, for orchestrating the deployment and operation of workspaces on an IHS.
Figure 2B:
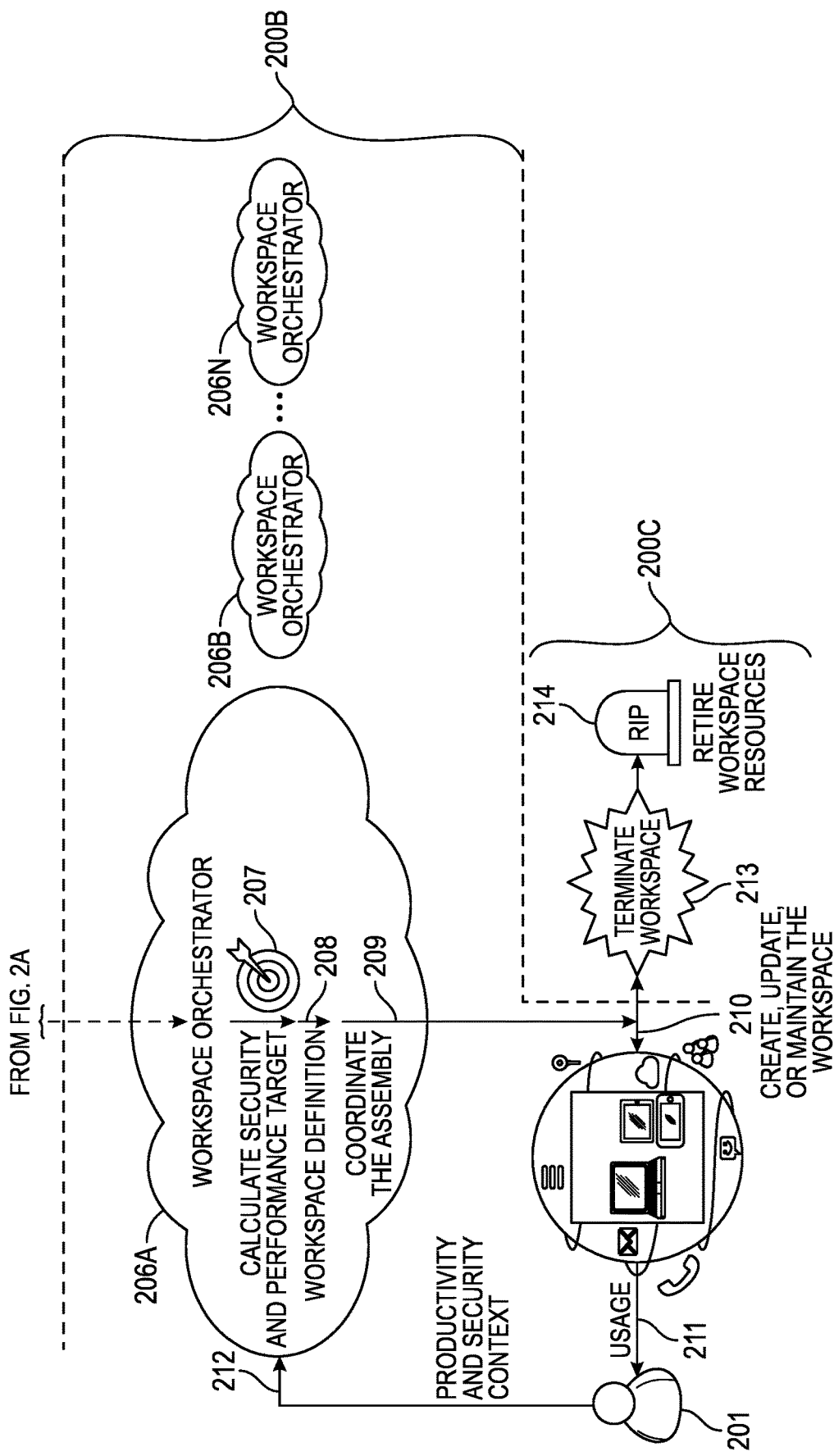

As indicated in FIGS. 2A and 2B, a variety of external devices 120A-H may be coupled to IHS 100, such as via I/O ports supported by I/O controllers 110 and/or via network interface 109. The external devices may include user-input devices, such as a mouse 120D, camera 120C or keyboard 120B, user-output devices, such as an HMD 120A, external display 120G, projector 120F or headphones 120H. In some instances, an external device coupled to IHS 100 may include standalone IHS, such as a mobile cellular device 120E (i.e., smartphone) that may be coupled to the IHS via a wired or wireless connection. As described in additional detail below, embodiments provided capabilities for deploying subordinate workspaces for operation on the discrete hardware of external peripheral devices 120A-H that are coupled to IHS 100.

Sensors 112 accessed via I/O controllers 110 may provide access to data describing environmental and operating conditions of IHS 100 (e.g., accelerometers, gyroscopes, hinge sensors, rotation sensors, hall effect sensors, temperature sensors, voltage sensors, sensors, IR sensors, photosensors, proximity sensors, distance sensors, magnetic sensors, microphones, ultrasonic sensors, etc.). In some embodiments, any or all of the sensors 112 coupled to IHS may be discrete devices with their own logic and memory resources that may be used in the operation of a workspace. A subordinate workspace may operate using the resources of such sensors 112 and may operate based on a subordinate workspace definition through orchestration provided by a primary workspace that operates on core resources of IHS 100.

In some cases, chipset 103 may include a sensor hub capable of utilizing information collected by sensors 112 in determining the relative orientation and movement of IHS 100. For instance, the sensor hub may utilize inertial movement sensors, that may include accelerometer, gyroscope, and magnetometer sensors, and are capable of determining the orientation and movement of IHS 100 (e.g., IHS 100 is motionless on a relatively flat surface, IHS 100 is being moved irregularly and is likely in transport, the hinge of IHS 100 is oriented in a vertical direction thus indicating the IHS 100 is being used in a book mode). In certain embodiments, the sensor hub may also include capabilities for determining a location and movement of IHS 100 based on triangulation of network signal and based on network information provided by the OS or network interface 109. In some embodiments, the sensor hub may support additional sensors, such as optical, infrared and sonar sensors, that may provide support for xR (virtual, augmented, and/or mixed reality) sessions hosted by the IHS 100 and may be used by the sensor hub provide an indication of a user's presence near IHS 100, such as whether a user is present, absent, inattentive and/or facing integrated display 108.

In cases where the end-user is present before IHS 100, the sensor hub may further determine a distance of the end-user from the IHS, where this determination may be made continuously, at periodic intervals, or upon request. The detected or calculated distances may be used by processor 101 to classify the user as being in the IHS's near-field (user's position<threshold distance A), mid-field (threshold distance A<user's position<threshold distance B, where B>A), or far-field (user's position>threshold distance C, where C>B). As described in additional detail below, the failure to detect an authenticated user of IHS 100 within a proximity of IHS 100 may result in a change in the security context of IHS 100, thus triggering a re-evaluation of the security risk of workspaces operating on IHS 100. Similar re-evaluation may be triggered based on the detection of additional individuals in proximity to IHS 100.

In embodiments where IHS 100 may support multiple physical configurations, such as a convertible laptop, N-in-1 device, or the like, the sensor hub may utilize one or more mode sensors 112 that collect readings that may be used in determining the posture in which IHS 100 is physically configured. In certain embodiments, such posture determinations may be additionally made using the movement and orientation information provided by sensors 112. In laptop and convertible laptop embodiments, for example, processor 101 or trusted controller 115 may utilize a lid position sensor 112 to determine the relative angle between the two panels of the laptop in order to determine the mode in which IHS 100 is physically configured. In such embodiments, the lid position sensor may measure the angle of rotation of the hinge that connects the base panel and lid panel of IHS 100. In some embodiments, processor 101 or trusted controller 115 may provide collected lid position information, such as the hinge angle, to the sensor hub for use in determining the posture in which IHS 100 is configured. In some embodiments, the sensor hub may interface directly with the lid position sensor in determining hinge angle information.

The sensor hub may determine the posture of IHS 100 based, at least in part, on the angle of rotation of the hinge of IHS 100 from a closed position. Starting from a closed position, a first range of hinge angles may indicate a laptop posture, a second range of hinge angles may indicate a landscape posture, and a third range of hinge angles may indicate a tablet posture of the IHS 100. The sensor hub may additionally utilize orientation and movement information collected from inertial movement sensors 112 to further determine the posture in which IHS 100 is physically configured. For instance, if the sensor hub determines that IHS 100 is configured with a hinge angle of a laptop configuration, but IHS 100 is oriented on its side with the hinge in a vertical orientation, the IHS may be determined to be in a book mode. In another example where the IHS 100 is determined to be tilted such that the hinge is oriented between horizontal and vertical, the user's face is detected to be facing the integrated display, and IHS 100 is experiencing irregular, slight movements, the sensor hub may determine that IHS 100 is being used in a book posture while the user is in transit. In another example, the sensor hub may determine that IHS 100 is opened to a 180-degree hinge angle and lies on a flat surface, thus indicating that IHS 100 it is being used in a landscape posture. The sensor hub may similarly determine that IHS 100 is in a tent configuration in response to detecting a hinge angle within a defined range, such as between 300 and 345 degrees, and also detecting an orientation of IHS 100 where the hinge is aligned horizontally and is higher than both of the display panels of IHS 100.

Other components of IHS 100 may include one or more I/O ports 116 for communicating with peripheral external devices as well as various input and output devices. For instance, I/O 116 ports may include HDMI (High-Definition Multimedia Interface) ports for use in connecting external display devices 120G to IHS 100 and USB (Universal Serial Bus) ports, by which a variety of external devices may be coupled to IHS 100. In some embodiments, external devices coupled to IHS 100 via an I/O port 116 may include storage devices that support transfer of data to and from system memory 105 and/or storage devices 119 of IHS 100. As described in additional detail below, the coupling of storage devices via an I/O port 116 may result in a change in the security profile of IHS 100, thus triggering a re-evaluation of the security risk of workspaces operating on IHS 100. In some embodiments, peripherals coupled to IHS 100 via I/O ports 116 may be discrete devices with their own logic and memory resources that may be used in the operation of a workspace. As described in additional detail below, a subordinate workspace may operate using the resources of such external peripherals and may operate based on a subordinate workspace definition through orchestration provided by a primary workspace that operates on core resources of IHS 100. In some scenarios, external peripherals coupled to IHS 100 may be a public or shared-use devices, such as a projector 120F utilized within a conference room.

Chipset 103 also provides processor(s) 101 with access to one or more storage devices 119. In various embodiments, storage device(s) 119 may be integral to IHS 100, or may be external to IHS 100. In certain embodiments, storage device(s) 119 may be accessed via a storage controller that may be an integrated component of the storage device. Storage device(s) 119 may be implemented using any memory technology allowing IHS 100 to store and retrieve data. For instance, storage device(s) 119 may be a magnetic hard disk storage drive or a solid-state storage drive. In some embodiments, storage device(s) 119 may be a system of storage devices, such as a cloud drive accessible via network interface 109. In some embodiments, storage devices 119 coupled to IHS 100 may be discrete devices with their own logic and memory resources that may be used in the operation of a workspace. A subordinate workspace may operate using the resources of such storage devices 119 and may operate based on a subordinate workspace definition through orchestration provided by a primary workspace that operates on core resources of IHS 100.

As illustrated, IHS 100 also includes BIOS (Basic Input/Output System) 117 that may be stored in a non-volatile memory accessible by chipset 103 via bus 102. Upon powering or restarting IHS 100, processor(s) 101 may utilize BIOS 117 instructions to initialize and test hardware components coupled to IHS 100. BIOS 117 instructions may also load an OS for use by IHS 100. BIOS 117 provides an abstraction layer that allows the OS to interface with the hardware components of IHS 100. The Unified Extensible Firmware Interface (UEFI) was designed as a successor to BIOS. As a result, many modern IHSs utilize UEFI in addition to or instead of a BIOS. As used herein, BIOS is intended to also encompass UEFI.

In certain embodiments, a trusted controller 115 is coupled to IHS 100 and may support various functions for management of IHS 100. For example, trusted controller 115 may be an embedded controller (EC) that is installed as a component of the motherboard of IHS 100. In various embodiments, trusted controller 115 may perform various operations in support of the delivery and deployment of a workspace to IHS 100. In certain embodiments, trusted controller 115 may interoperate with a remote orchestration service via an out-of-band communications pathway that is isolated from the OS that runs on IHS 100. Network interface 109 may support such out-of-band communications between trusted controller 115 and a remote orchestration service. In some embodiments, such out-of-band communications may be utilized by a remote orchestration service in communicating with the trusted controller 115 in selecting the resources of the IHS that are used as the underlying computing architecture that is used to host a workspace on the IHS 100.

Trusted controller 115 may receive cryptographic information required for secure delivery and deployment of a workspace to IHS 100. In such embodiments, the cryptographic information may be stored to secured storage 121 maintained by trusted controller 115. Additionally, or alternatively, trusted controller 115 may support execution of a trusted operating environment that may support cryptographic operations used to deploy a workspace on IHS 100. Additionally, or alternatively, trusted controller 115 may support deployment of a workspace within the OS of IHS 100 via an out-of-band communications channel that is isolated from the OS and allows the workspace to communicate with a trusted agent process of the OS.

Trusted controller 115 may also provide support for certain cryptographic processing used to support secure deployment and operation of workspaces on IHS 100. In some embodiments, such cryptographic processing may be provided via a secure logical environment that operates using computational and memory resources of trusted controller 115, where the environment operates in isolation from the software and other hardware components of IHS 100. In some embodiments, trusted controller 115 may rely on cryptographic processing provided by dedicated cryptographic hardware supported by the IHS, such as a TPM (Trusted Platform Module) microcontroller. In some embodiments, the memory resources of trusted controller 115 include a secured storage 121 that may be utilized to store cryptographic information for use in authorization of workspaces.

In certain embodiments, cryptographic capabilities of trusted controller 115 may be used to calculate signatures that uniquely identify individual components of IHS 100. In such scenarios, trusted controller 115 may calculate a hash value based on instructions used to configure a hardware component coupled to IHS 100 and/or based on a set of instructions used to operate a software program. For instance, trusted controller 115 may calculate a hash value based on firmware, settings and/or other instructions that are used in the operation of a hardware component coupled to the IHS 100, such as by a network controller, storage drive, storage controller, FPGA, or hardware accelerator. In some instances, reference signatures for individual components of an IHS 100 may be calculated as part of a trusted manufacturing and factory provisioning process of the IHS and may be stored for use as reference signatures within a secure storage 121 of the trusted controller 115.

Once the IHS 100 has been delivered and deployed, trusted controller 115 may be configured to calculate hash values based on firmware and other instructions that are loaded for use by individual hardware components of the IHS. The hash value recalculated for the component may then be compared against the reference signature in order to determine if any modifications have been made to the instructions to be used to operate the component, thus indicating the component has been compromised. In this manner, trusted controller 115 may be used to validate the integrity of hardware and software components installed on IHS 100. In certain embodiments, remote orchestration service 206 may verify the integrity of trusted controller 115 in the same manner, by calculating a signature based on instructions being utilized to operate trusted controller 115 and comparing it to a reference signature calculated during a trusted process for manufacture of IHS 100. In various embodiments, one or more of these operations supported by trusted controller 115 may be implemented using BIOS 117.

In some embodiments, firmware instructions utilized by trusted controller 115 may also implement procedures for the management of power that is available for operating IHS 100. For instance, trusted controller 115 may interface with a power adapter in managing the output levels of the power adapter that may be drawn for use by IHS 100. In some embodiments, trusted controller may determine the power status of IHS 100, such as whether IHS 100 is operating strictly from battery power or is plugged into an AC power source, and may specify restrictions on power use based on the power status of the IHS. Trusted controller 115 may be used to operate a secure execution environment that may include operations for managing various core functions of IHS 100 based on power availability, such as power management and management of certain operating modes of IHS 100 (e.g., turbo modes, maximum operating clock frequencies of certain components, etc.). Accordingly, IHS 100 may support the use of various power modes. In some embodiments, the power modes of IHS 100 may be implemented through operations of trusted controller 115 and/or the OS of IHS 100. In various embodiments, IHS 100 may support various reduced power modes in order to reduce power consumption and/or conserve battery power when IHS 100 is not actively in use, and/or to control a level of performance available to the user by increasing or decreasing a maximum operating clock frequency of a component of IHS 100 (e.g., processor(s) 101).

In managing operating modes of IHS 100, trusted controller 115 may implement operations for detecting certain changes to the physical configuration of IHS 100 and managing the modes corresponding to different physical configurations of IHS 100. For instance, where IHS 100 is a laptop computer or a convertible laptop computer, trusted controller 115 may receive inputs from a lid position sensor 112 that may detect whether the two sides of the laptop have been latched together to a closed position. In response to lid position sensor 112 detecting latching of the lid of IHS 100, trusted controller 115 may initiate operations for shutting down IHS 100 or placing IHS 100 in a low-power mode.

As described in additional detail below, an IHS 100 may support the operation of one or more workspaces, each operating using resources of IHS 100 that are specified within a respective workspace definition, where an individual workspace provides operation of software programs and access to protected data in varying degrees of isolation from the operating system of the IHS and from other workspaces. Also as described in additional detail below, an individual workspace may be hosted by an IHS 100 using various combinations of the described software and hardware resources of the IHS. For instance, a workspace may be configured to operate as a type of virtual machine that runs in isolation from the operating system of the IHS 100, but that relies on certain shared software libraries and other resource of the IHS 100. In another instance, a workspace may operate as a different type of virtual machine that not only runs in isolation from the operating system of the IHS 100, but also does not share any libraries and operates using a segregated portion of memory 105 of the IHS. In another instance, a workspace may operate as a container application that runs within the operating system of the IHS 100, but that provides a segregated computing environment in which applications and data that are accessed via the container are not otherwise accessible by other programs or containers hosted by the operating system. In another instance, a workspace may operate within the operating system of an IHS 100 as a web-browser application that runs using libraries and other resources utilized by the web browser. In another instance, a workspace may be configured to operate such that a graphical interface for the workspace is displayed in a display device 108, 120G of the IHS 100, but the workspace operates in full or in part in a cloud resource, thus isolating certain aspects of the workspace entirely from the IHS 100. In each of these scenarios, a workspace may operate using a primary workspace that operates on core resources of an IHS and also using one or more subordinate workspaces that operate on external devices that are coupled to an IHS 100.

Each of these exemplary computing architectures that utilize resources of IHS 100, to support workspaces present different attack surfaces that may be exploited by malicious actors. As described in additional detail below, the computing architecture that is selected for use by a workspace may be selected based in part on a security context that may account for the security posture of the IHS 100, the user of the IHS 100, the use of subordinate workspaces, the environment in which IHS 100 is being operated and/or the information that is being accessed via the workspace, the security context posed by each peripheral device 120A-H that is coupled to the IHS. As such, the attack surface presented by the computing architecture of a workspace, and any subordinate workspaces, may be selected to be commensurate with the security context in which the workspace will operate.

In some embodiments, an IHS 100 may not include all of the components shown in FIG. 1. In other embodiments, an IHS 100 may include other components in addition to those that are shown in FIG. 1. Furthermore, some components that are represented as separate components in FIG. 1 may instead be integrated with other components. For example, in certain embodiments, all or a portion of the operations executed by the illustrated components may instead be provided by components integrated into processor(s) 101 as a System-on-Chip.

In some embodiments, the construction of a workspace for a particular purpose and for use in a particular context may be orchestrated remotely from IHS 100 by workspace orchestration services 206, such as described with regard to FIGS. 2A and 2B. In some embodiments, portions of the workspace orchestration, including the creation and delegation of tasks to subordinate workspaces, may be performed locally on IHS 100. IHS 100 may be configured with program instructions that, upon execution, cause IHS 100 to perform one or more of the various operations disclosed herein. In some embodiments, IHS 100 may be an element of a larger enterprise system that may include any number of similarly configured IHSs in network communications with each other.

FIGS. 2A and 2B is a diagram depicting a method, according to various embodiments, for orchestrating the deployment and operation of workspaces on an IHS 100. For sake of illustration, method 200 has been split into three phases: workspace initialization phase 200A, workspace orchestration phase 200B, and workspace termination phase 200C. During initialization 200A, user 201 (e.g., an enterprise user) operates an IHS 100 (e.g., a desktop, a laptop, a tablet, a smart phone, etc.), such as described with regard to FIG. 1, within physical environment 202 (e.g., any type of environment and its associated context, including physical location, geographic location, location within a particular facility or building, detected wireless networks, time of day, proximity of the user to IHS 100, other individuals in the vicinity of IHS 100, etc.).

Method 200 may begin with the user 201 selecting workspace options that are supported by launch point 203 that may be, for example, a corporate launch point provided by an employer of user 201, a launch point provided by the manufacturer of IHS 100, a launch point provided in support of a software application operating on IHS 100, or a launch point provided as a service to user 201 by a third-party. In some implementations, user 201 may operate IHS 100 to access launch point 203 provided, for example, in the form of a web portal, a portal application running in the OS of IHS 100, a special-purpose portal workspace operating on IHS 100, or the like. In various implementations, launch point 203 may include Graphical User Interface (GUI) elements representing different software applications, data sources and/or other resources that the user may desire to execute and/or manipulate within a workspace. In various embodiments, launch point may provide a graphical, textual and/or audio interface by which data or other resources may be requested for use within a workspace by a user 201. In this manner, a user 201 may be provided with launch point 203 selections that provide access to one or more software applications and an aggregation of user's data sources that are available across one or more datastores (e.g., local storage, cloud storage, etc.).

As described in additional detail below, workspaces for providing user 201 with access to requested data or other resources may operate using a local management agent 332 that operates on IHS 100 and is configured to interoperate with a workspace orchestration service that may include one or more remote workspace orchestrators 206A-N. In various embodiments, launch point 203 may be provided in the form of a portal (e.g., a webpage, OS application or special purpose workspace) that allows user 201 to request access to managed resources. In various embodiments, launch point 203 may be hosted by a remote workspace orchestrator 206A-N, local management agent 332 operating on IHS 100, or any suitable combination thereof. Examples of launch point 203 technologies may include WORKSPACE ONE INTELLIGENT HUB from WMWARE, INC., and DELL HYBRID CLIENT from DELL TECHNOLOGIES INC., among others.

The initialization phase 200A of a workspace may begin when user 201 chooses to launch an application or access a data source managed by a workspace orchestration service that may be implemented using one or more workspace orchestrators 206A-N. In response to an access request issued by user 201 (e.g., the user "clicks" on an icon of launch point 203), local management agent 332 of IHS 100 collects initial security and productivity context information at 204. For example, security context information may include attributes indicating a security risk associated with: the data and/or application being requested, a level of risk presented by the user 201, the hardware utilized by IHS 100, the logical environment of IHS 100 in which a workspace will be deployed to provide access to the requested data and/or application, characteristics of external devices 120A-H that are coupled to IHS 100, and the physical environment 202 in which IHS 100 is currently located.

Accordingly, in this disclosure, the term "security context" generally refers to data or other information related to a security posture in which a workspace will be deployed and utilized, where the security posture may be based on the user, IHS 100, security characteristics of external devices 120A-H coupled to IHS 100, data to be accessed via the workspace, and/or environment 202. A security context may be quantified as a security risk score in support of evaluations of the level or risk associated with providing user 201 access to requested data and/or application while using IHS 100 in the particular context. A "security risk score" or "security score" generally refer to a numerical value usable to score, quantify, or measure various security characteristics of the security context associated with a request. A risk score may be an aggregate score associated with the overall security risk context, whereas a "risk metric" may be a measurement of risk for a sub-category of some part of the security context.

For example, security metrics that may be used in the calculation of a security risk score for a particular security context may include, but are not limited to: a classification of the requested data source and/or application, authentication factors used to identify user 201, the location of IHS 100, a role or other group classifications associated with user 201, validation of networks in use by IHS 100, type of network in use by IHS 100, network firewall configurations in use by IHS 100, indicators of attack (IoA), indicators of compromise (IoC) regarding IHS 100 or a resource being requested by user 201, patch levels associated with the OS and other applications in use on IHS 100, availability of encryption, type of available encryption, access to secured storage, use of attestable hardware by IHS 100, supported degree of workspace isolation by IHS 100, hardware and software of external devices 120A-H that are coupled to IHS 100, etc.

The term "productivity context" generally refers to user productivity associated with a workspace, user, IHS, and/or environment. A "productivity score" generally refers to an index usable to score, quantify, or measure various productivity characteristics of a productivity context. Examples of productivity context information include, but are not limited to: the hardware of the IHS, the software of the IHS (e.g., the OS), power states and maximum clock frequencies of selected components of the IHS, capabilities of peripheral devices 120A-H coupled to the IHS, either permanently or temporarily, networks available to the IHS and the performance characteristics of those networks, software installers available on the IHS, etc.

Initial productivity and security targets for instantiation of a workspace may be calculated based on the context of user's 201 actions in requesting the workspace (e.g., procedures used to identify the user) combined with the productivity and security context in which the workspace will operate. The productivity and security targets may also be based on behavioral analytics related to user 201, IHS 100 telemetry and/or environmental information (e.g., collected via sensors 112). In some cases, at 205, a local management agent operating on IHS 100 may calculate initial security and productivity targets based upon the collected security and productivity context. In other cases, a remote workspace orchestrator 206A-N may calculate security and productivity targets for instantiation of a workspace on IHS 100.

As used herein, the term "security target" generally refers to the attack surface presented by a workspace that is created and operated based on a workspace definition, while the term "productivity target" generally refers to the productivity characteristics of a particular workspace definition. Examples of a productivity target include, but are not limited to: type of data or data source available to user 201, minimum latency of a workspace, responsiveness of the IHS 100, etc. Attributes that may be used to characterize a security target may include, but are not limited to: a minimum security score for a workspace, a minimum trust score of IHS 100, authentication requirements for user 201 (e.g., how many authentication factors are required, frequency of re-authentication), minimum level of trust in the network utilized by a workspace, required isolation of a workspace from other processes operating on IHS 100, the ability to access a browser within a workspace, the ability to transfer data between workspaces, the ability to extend a primary workspace using one or more subordinate workspaces, the security context for any subordinate workspaces, APIs used to support subordinate workspaces operating on external devices 120A-H, etc.

Moreover, the term "workspace definition" generally refers to a collection of attributes that describe aspects a workspace that may be assembled, created, and deployed in a manner that satisfies a security target (i.e., the definition provides an attack surface for the workspace that presents an acceptable level of risk) and a productivity target (e.g., data access, access requirements, upper limits on latency, etc.) in light of the security context (e.g., location, patch level, threat information, network connectivity, etc.) and the productivity context (e.g., available computing resources on IHS 100, performance characteristics of IHS 100, network speed, etc.) in which the workspace is to be deployed. A workspace definition may enable fluidity of migration of an instantiated workspace, since the definition supports the ability for a workspace to be assembled on any IHS according to embodiments that is configured for operation with a workspace orchestration service.

In describing capabilities and constraints of a workspace, a workspace definition 208 may prescribe one or more of: authentication requirements for user 201, containment and/or isolation of the workspace (e.g., local application, sandbox, docker container, progressive web application or "PWA," Virtual Desktop Infrastructure "VDI," etc.), primary applications that can be executed in the defined containment of the workspace to enable user 201 to be productive with one or more data sources, additional applications that are included in the workspace to enhance productivity, security components that reduce the scope of the security target presented by the productivity environment (DELL DATA GUARDIAN from DELL TECHNOLOGIES INC., an anti-virus, etc.), the data sources to be accessed and requirements for routing that data to and from the workspace containment (e.g., use of VPN, minimum encryption strength), workspace capabilities to independently attach other resources, constraints on the ability to generate subordinate workspaces, descriptions of any already operating subordinate workspaces, etc.

In some embodiments, the workspace definition 208 selected for operation of a workspace may specify a computing architecture for use in the operation of the workspace. Such a computing architecture may be selected for use by a workspace based in part on a security context of the IHS, where this security context may account for factors such as the security posture of the IHS 100, the user 201 of the IHS 100, the environment 202 in which IHS 100 is being operated and/or the information that is being accessed via the workspace. In this manner, the attack surface presented by the computing architecture in use by a workspace may be selected to be commensurate with the security context in which the workspace will operate. In some embodiments, a computing architecture in use by a workspace may include the use of one or more subordinate workspaces that may operate using the discrete logic and memory resource of devices 120A-H that are coupled to an IHS 100, thus altering the attack surface of the workspace.

In some implementations, workspace definitions may be based at least in part on static policies or rules defined, for example, by an enterprise's Information Technology (IT) Decision Maker (ITDM). In some implementations, static rules may be combined and improved upon by machine learning (ML) and/or artificial intelligence (AI) algorithms that evaluate historical productivity and security data collected as workspaces are life cycled. In this manner, rules may be dynamically modified over time to generate improved workspace definitions. If it is determined, for instance, that a user dynamically adds a text editor every time he uses MICROSOFT VISUAL STUDIO from MICROSOFT CORPORATION, then workspace orchestration service 206A-N may autonomously add that application to the default workspace definition for that user.

Still with respect to FIGS. 2A and 2B during orchestration 200B, the initial security and productivity targets are processed and/or reconciled against resources, device capabilities, and cloud services available, etc., to produce a workspace definition at 208. As described, a workspace definition may specify capabilities and constraints of a workspace, such as: runtime security requirements of the workspace containment (e.g., such as isolation from the OS of IHS 100 or from certain hardware of IHS 100), the use of reference measurements to attest to the integrity of the workspace once running, applications to be provided for operation within the workspace, aggregation of resources available via the workspace, access configurations (e.g., virtual private network or "VPN"), any subordinate workspaces, one or more remote workspace orchestrators 206A-N that are authorized to modify a workspace definition or to otherwise interface with a workspace, etc.

The initial workspace definition may then be utilized by automation engine 302 of workspace orchestration service 206 to coordinate assembly 209 and instantiation 210 of a workspace using a selected computing architecture of the IHS 100 in which the workspace will operate. In cases where a workspace is cloud-hosted, automation engine 302 may assemble and instantiate a remote workspace that may be accessed via a secure connection established via a web browser or other web-based component operating on IHS 100. In some embodiments, automation engine 302 may resolve configuration conflicts between a workspace definition and the user's inputs in the operation of a workspace.

The instantiated workspace is operated by user 201 at 211, and new productivity and security context information related to the behavior or use of data is generated at 212. This operation of a workspace may result in a change or new classification of data based upon what user 201 has done, accessed, and/or created, thus resulting in a change to the security context of the workspace. To the extent the user's behavioral analytics, device telemetry, and/or the environment has changed to a quantifiable degree, these changes in security context may serve as additional input for a reevaluation of the security and performance targets at 207 by automation engine 302. Additionally, or alternatively, new workspace context, security target, and/or productivity target may be now measured against the initial targets, and the result may cause automation engine 302 to produce a new workspace definition at 208, if appropriate.

Particularly, if the productivity score and/or the security score for an instantiated workspace change such that a score is outside of the range of the respective target index, automation engine 302 may determine appropriate modifications to an existing workspace and deploy such modifications at 210. In instances where the difference between one or both of the productivity and security score and a respective index is a below a threshold value, the automation engine 302 may generate an updated workspace definition that adapts the existing workspace for operation in the updated security and/or productivity context. In instances where the difference between the productivity and security score and a respective index is a above a threshold value, the automation engine 302 may elect to terminate 213 the existing workspace and to generate a new workspace definition for a new workspace 210 that is configured for operation in the updated security and/or productivity context. In generating a new workspace 210, session data metadata and context may be preserved by data aggregation engine 336 and session data may be restored within the new workspace as applicable.

Additionally, or alternatively, method 200 may terminate or retire the initial or previous workspace at 213, as part of termination phase 200C. In some cases, user action may initiate the termination process (e.g., user 201 closes application or browser accessing data) and/or termination may take place automatically as part of an adjustment in workspace definition (e.g., the isolated environment is instructed to terminate by automation engine 302). Still as part of termination phase 200C, workspace resources of IHS 100 and/or at workspace orchestration service 206 may be released.

As indicated in FIGS. 2A and 2B, method 200 may include the use of multiple remote workspace orchestrators 206A-N that participate in the launching and operation of a workspace on an IHS 100. In various embodiments, any number of remote workspace orchestrators 206A-N may participate in the ongoing operation of a workspace. For instance, remote workspace orchestrator 206A may be operated by the manufacturer of IHS 200 and may support configuration of a workspace on IHS 200 that provides the user with a launch point for requesting access to protected resources. Through this launch point, a user may select access to protected corporate data, such as a spreadsheet that includes protected corporate financial information. Based on this selection, a local management agent operating on IHS 200 may invoke a corporate remote workspace orchestrator 206B that provides a workspace definition for use in configurating and operating a new workspace on IHS 200 that provides protected access to the requested spreadsheet. In one scenario, safely accessing the requested spreadsheet may require installation of an updated spreadsheet program on IHS 200. In this scenario, the local management agent of the IHS 200 may invoke a third remote workspace orchestrator 206N for initiating an update to the spreadsheet program that is available through the workspace. In this manner, various remote workspace orchestrators 206A-N may support the deployment and ongoing operation of workspaces on an IHS 200.

As such, in various embodiments, method 200 enables secure user productivity even when a workspace operates on an IHS or cloud platform that is not under direct management. Method 200 also provides for dynamic or adaptive configurations and policies allowing for the best possible user experience while maintaining appropriate level of security. In some cases, the definition of a productivity environment and access requirements may be selected based upon productivity and security dependencies and targets, and the definition of capabilities related to the workspace may be adaptive in nature. Particularly, workspace definition attributes may be dynamically selected based upon historical productivity and security information, based upon each individual user or group's behavior.

Figure 3A:
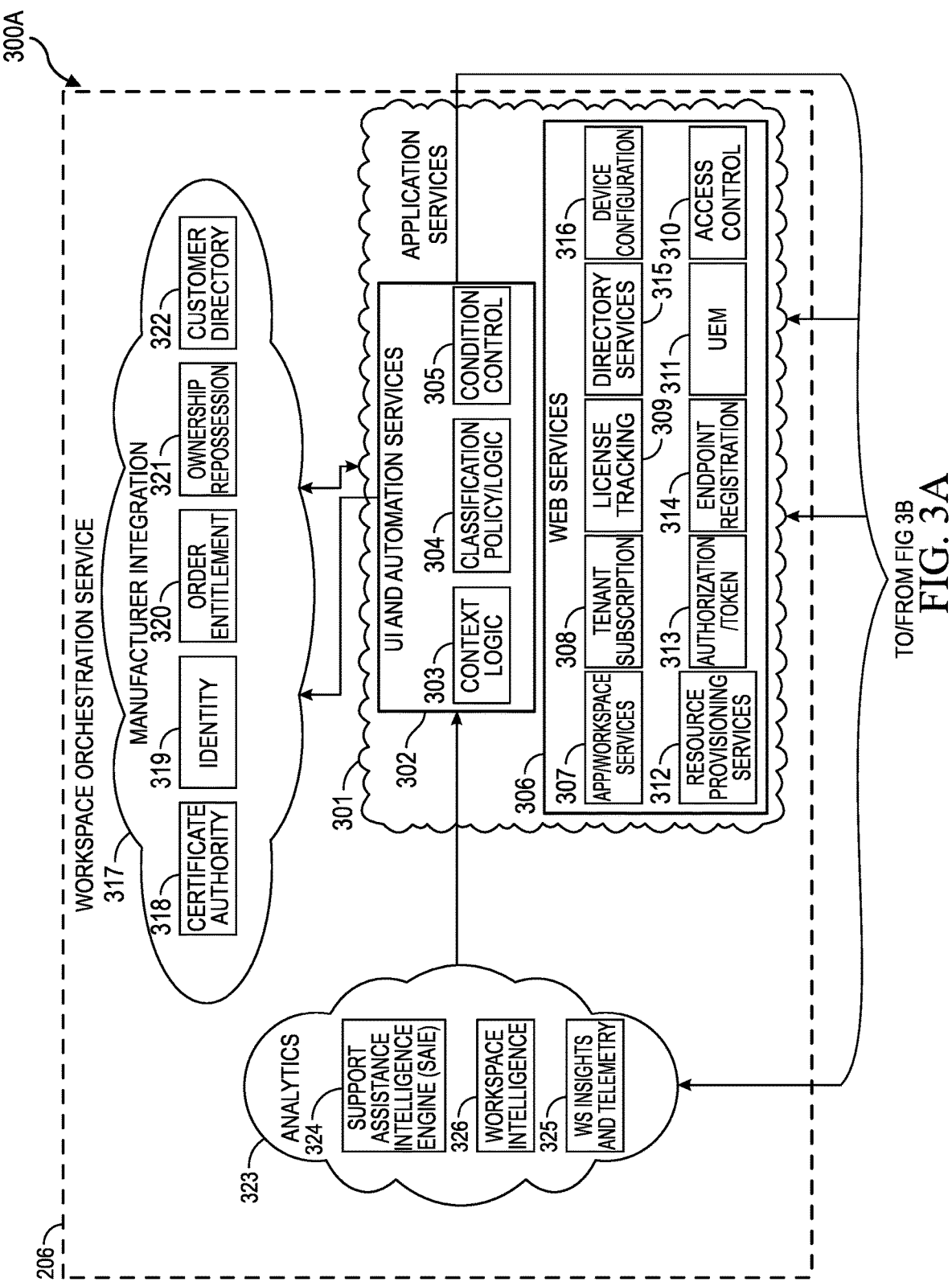
FIGS. 3A and 3B are a diagram depicting an example of a system configured, according to various embodiments, for deploying and operating workspaces on an IHS.
Figure 3B:
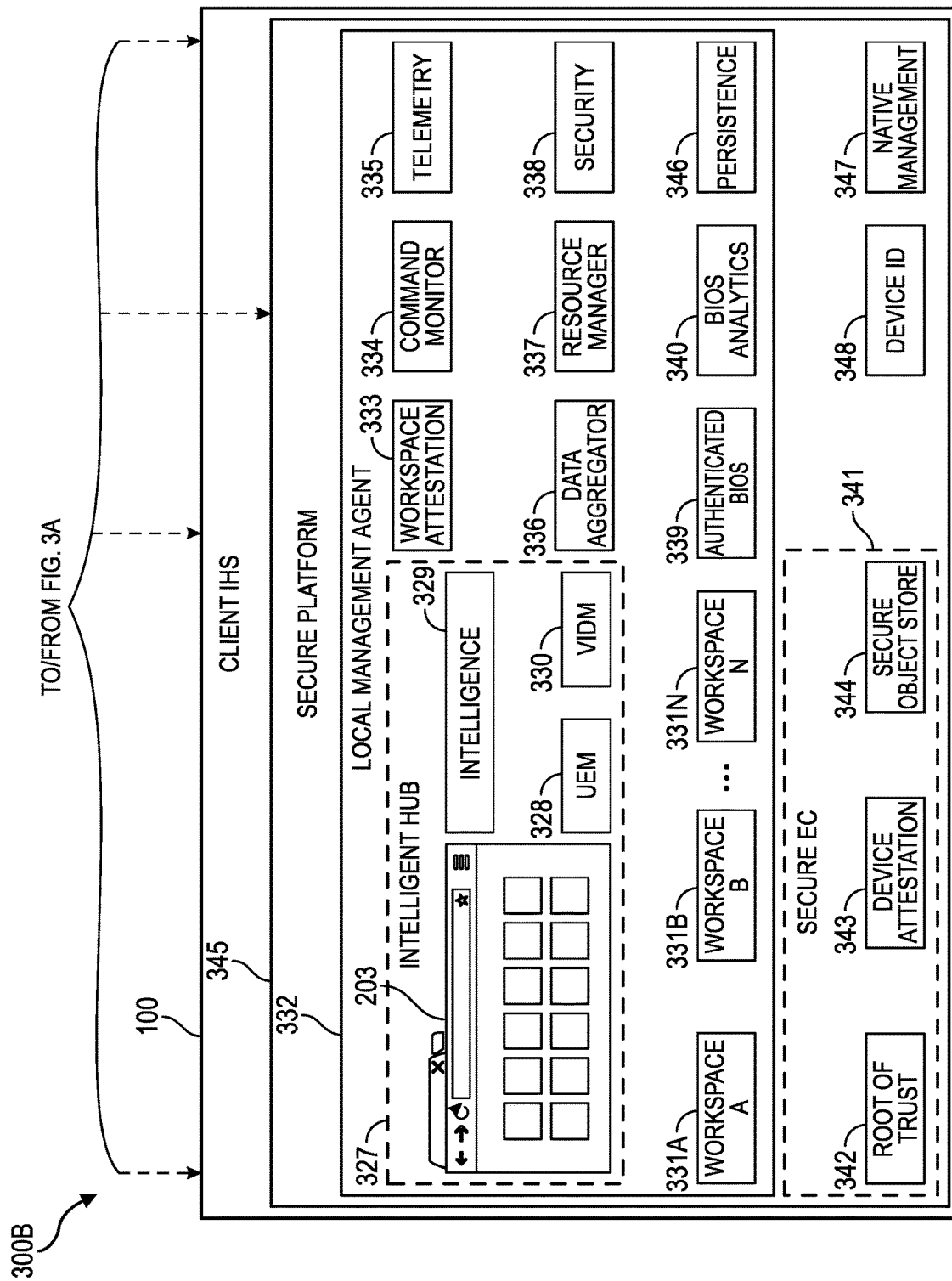

FIGS. 3A and 3B show a diagram of an example of system components 300A and 300B (collectively referred to as "system 300") configured for the operation of subordinate workspaces on an IHS. Particularly, system 300 may include one or more IHSs remotely located and/or networked having program instructions stored thereon that, upon execution, cause the one or more IHSs to perform various workspace orchestration operations described herein, including, but not limited to: the dynamic evaluation of security and productivity targets based upon updated context information received from IHS 100, the calculation of risk scores and other productivity and security metrics based on ongoing collection of context information, the generation of workspace definitions, and the assembly of one or more files or policies that enable the instantiation of a workspace in accordance with a workspace definition at a cloud service and/or IHS 100.

System 300 may include program instructions that, upon execution, cause IHS 100 to perform various local management operations described herein, including, but not limited to, the collection of productivity and security context information, the calculation of productivity scores and/or risk scores, the instantiation, execution, and modification of a workspace based upon files, definitions, or policies, such as workspace definitions.

Components 300A and 300B of system 300 may be coupled to and/or in communication with each other via any suitable network technology and/or protocol, which allows workspace orchestration service 206 to be remotely provided with respect to local management agent 332. As described with regard to FIG. 1, an IHS 100 according to embodiments may include a component such as a trusted controller that may support certain secure out-of-band communications that are independent from the OS of IHS 100. In some embodiments, such a trusted controller may be configured to support deployment and operation of local management agent 332 and/or to report changes in context to workspace orchestration service 206.

As described with regard to FIGS. 2A and 2B, multiple workspace orchestration services 206A-N may operate in support of a workspace. Accordingly, workspace orchestration service illustrated in FIG. 3A may correspond to any of these individual workspace orchestration services 206A-N, where each of these workspace orchestration services may include any of all of the components and systems described with regard to FIG. 3A. In some embodiments, orchestration of an individual workspace operating on IHS 100 may be transferred between different workspace orchestration services throughout the lifecycle of the workspace. For instance, a workspace may be configured and initialized based on a workspace definition provided by a workspace orchestration service that is operated by the manufacturer of IHS 100. However, during ongoing operation of this particular workspace, orchestration of the workspace may be transferred to a workspace orchestration service operated by an entity that employs the user of IHS 100. Further operation of this workspace may then result in orchestration being transferred to a workspace orchestration service operated by a provider of software operating on the IHS, such as by the provider of an operating system of IHS 100. In some embodiments, orchestration of a workspace may be transferred to a special-purpose orchestrator that supports an IHS 100 in configuring subordinate workspaces, and in particular for operation of subordinate workspace by unknown or untrusted peripheral devices that are coupled to the IHS, such as I/O devices provided by a public or shared workstation.

As illustrated in system 300A of FIG. 3A, workspace orchestration service 206 may include a number of subcomponents that support deployment and ongoing evaluation and adaptation of workspaces on IHS 100. Embodiments of workspace orchestration service 206 may include systems that may support: web services 306, manufacturer integration 317, and analytics services 323. Moreover, web services 306 may comprise application services 301 and user interface (UI) and automation services 302.

Analytics services 323 may be configured to receive and process context information from IHS 100, both during initial configuration of a workspace and in ongoing support of workspaces, and to provide that information, along with any analytics generated, to context logic 303 of application services 301. Based on information collected during the deployment and ongoing support of workspaces, support assistance intelligence engine (SAIE) 324 may be configured to generate and/or analyze technical support information (e.g., updates, errors, support logs, etc.) for use in diagnosing and repairing workspace issues. Workspace insights and telemetry engine 325 may be configured to analyze and/or produce device-centric, historical, and behavior-based data (e.g., hardware measurements, use of features, settings, etc.) resulting from the operation of workspaces. Workspace intelligence module 326 may include any suitable intelligence engine, such as machine learning models, for processing and evaluating collected context data in order to identify patterns and tendencies in the operation of workspaces and in the adaptation of workspaces based on context changes.

Application services 306 system of workspace orchestration service 206 includes UI and automation services 302 system that may include context logic module 303, classification policy 304, and condition control module 305. Context logic module 303 may support processing of context information in making risk assessments (e.g., evaluating the risk associated requests by the user against the context of the user's behavior, history of the user's IHS, capabilities of the user's IHS, and environmental conditions). For instance, security context information collected by IHS 100 may be provided to workspace orchestration service 206 where it may be used, such as by context logic 303, to calculate a risk score associated with a request for use of a managed data source and/or application. Classification policy 304 may include administrator and machine-learning defined policies describing risk classifications associated with different security contexts, such as risk classifications for specific data, locations, environments, IHSs, logical environments, risk classifications for subordinate workspace topologies, or user actions (e.g., use of high-risk data requires use of a workspace definition suitable for use with a risk score above a specific value). Condition control module 305 may include intelligence providing automated decision making for appropriately aligning risk and context. In some cases, condition control module 305 may dynamically deploy a solution to address any detected misalignment of risk and context. For instance, upon requesting access to a highly classified data source that results in a significant increase in risk score, the condition control module 305 may select workspace definition modifications that implement security procedures that are suitable for the higher risk score. In another example, based on hardware resources available on an IHS 100, the condition control module 305 may determine a risk score for an existing workspace operating on the IHS may be lowered through adaptation of the workspace into a primary workspace that operates using the core hardware resources of the IHS and one or more subordinate workspaces that operate on discrete external hardware components 120A-H coupled to IHS 100.

Application services 301 may include a group of web services 306 called on by UI and automation services 302 to support various aspects of the orchestration of workspaces. Particularly, web services 306 may include application and workspace services 307 that may assemble and package applications for deployment in a workspace (e.g., an ".msix" file packaged and deployed to a MICROSOFT HYPER-V container). In some embodiments, a workspace definition may be used to specify whether a user will be provided access to an application in this manner. Web services 306 may also include a tenant subscription module 308, that performs dynamic configuration of an IHS and deployment of the described workspace orchestration services at the point-of-sale (POS) of an IHS, or of hardware or software components purchased for installation in the IHS. A license tracking module 309 may be used to maintain and track license information or other entitlement credentials for software, services, and IHSs. An access control module 310 may specify polices used in controlling access to data and applications by authorized users. A Unified Endpoint Management (UEM) module 311 may be configured to support the described orchestration of workspaces on various different IHSs that may be utilized by a particular user.

Web services 306 that may be used in support of workspaces may further include resource provisioning services 312 for configuring an IHS or workspace with secrets/credentials necessary to access specific resources (e.g., credentials for use of VPNs, networks, data storage repositories, workspace encryption, workspace attestation, and workspace-to-device anchoring). In some cases, resource provisioning services 312 may include secrets provisioned as part of a trusted assembly process of IHS 100 and, in some instances, associated with a unique identifier 348 of the IHS 100. Web services 306 may also include an authorization/token module that provides identity functions and may connect to various authentication sources, such as, for example, Active Directory. Endpoint registration module 314 may be configured to register IHSs and/or workspaces with management service that tracks the use of the described workspace orchestration. In some scenarios, a directory services 315 module may be configured to provide active directory services (e.g., AZURE ACTIVE DIRECTORY from MICROSOFT). Device configuration services 316 enable central configuration, monitoring, managing, and optimization of workspaces that in certain contexts may operate remotely from an IHS and may only present the user of the IHS with an image of the workspace output. In cooperation with resource provisioning services 312, device configuration services 316 may also handle secret creation and IHS configuration, configuration of IHS 100, and configuration of shared-use peripheral devices that are coupled to IHS 100.

As described, an IHS 100 may operate a primary workspace and one or more subordinate workspaces that operate on peripheral devices that are coupled to the IHS. In some instances, an IHS may be able to operate with subordinate workspaces on peripheral devices without input from a remote orchestrator beyond providing a workspace definition that authorizes local orchestration of subordinate workspace by a primary workspace of the IHS. For example, an IHS such as a laptop may be coupled to a public workstation, such as at a hotel or airport, that includes peripheral devices such as an external monitor, mouse, keyboard and/or printer. In some instances, one or more of these peripheral devices may have been previously configured to operate a subordinate workspace. In some instances, a subordinate workspace the is operating on a peripheral device specifies one or more roles that may be fulfilled by that particular peripheral device. In such instances, upon coupling an IHS laptop to the workstation, and thus to these peripheral devices, the primary workspace that is operating on the IHS identifies the subordinate workspaces that are already operating on the peripheral devices and initiates local orchestration of these subordinate workspaces.

However, in some instances, an IHS may rely on a remote orchestrator to assist in configuring peripheral devices for operation of subordinate workspaces. In such instances, the IHS 100 may interface with resource provisioning services 312 of a workspace orchestration service 300A to configure unknown and/or untrusted peripheral devices. Based on information reported by the IHS, the resource provisioning services 312 may identify a detected peripheral device and to provide a subordinate workspace definition for configuring the peripheral device for operation by a primary workspace operating on the IHS. In some embodiments, resource provisioning services 312 may identify specific roles that may be fulfilled by the detected peripheral device and provides a subordinate workspace definition that configures support for one or more roles by the peripheral device.

Still referring to FIG. 3A, manufacturer integration components 317 may communicate with application services 301 and client IHS 100 to provide features that are usable during workspace evaluation and instantiation, where these features are based upon information available to the manufacturer of client IHS 100. For instance, certificate authority 318 may include or provide access to a certificate authority that issues digital certificates that may be used in validating the authenticity and integrity of the hardware of IHS 100. Identity service module or engine 319 may be configured to manage the identity of a user and/or owner of an IHS, as well as brokering user identification for utilizing and updated customer directory 322. Order entitlement module 320 may be responsible for managing the entitlements purchased as well as the associated issued certificates, that may include certificates signed by a certificate authority 318. Ownership repository 321 may manage user entitlements associated with IHSs and their ownership and may provide support for users transferring ownership of an IHS and conveying the entitlements associated with that IHS. In certain scenarios, ownership repository 321 may use this transfer of ownership to decommission the secrets associated with the entitlements embedded in the IHS. Customer directory 322 may be configured to authenticate and authorize all users and IHSs in a network, such as assigning and enforcing security policies for all IHSs and installing or updating software (in some cases, customer directory 322 may work in cooperation and/or may be the same as directory services 315).

Referring now to FIG. 3B, in some embodiments, IHS 100 may be configured to operate local management agent 332 that may run within a secure execution environment 345 hosted by trusted controller 341, such as trusted controller 115 of FIG. 1. In other embodiments, local management agent 332 may operate as a trusted and attestable process of the OS of IHS 100. In some embodiments, local management agent 332 may include a workspace engine suitable for instantiating and managing the operation of one or more workspaces 331A-N on IHS 100. As described, the capabilities of a workspace may be modified based on changes in the productivity and security contexts in which the workspace is operating. Accordingly, depending on the context in which the workspace is operating, the workload(s) in each of workspaces 331A-N may be hosted in a public cloud, a private cloud, a specific server, using various topologies of subordinate workspace, or locally hosted in full or in part on IHS 100. These allocations of computing resources that comprise the computing architecture for each particular workspace 331A-N may be individually prescribed by the respective workspace definition that is used to build and operate each workspace. As described, the workspace definition may be created by workspace orchestration service 206 based upon context information provided by IHS 100, security targets for each workspace 331A-N, and productivity targets for each workspace 331A-N.

In some embodiments, local management agent 332 may be configured to host, launch, and/or execute a workspace hub 327 that provides a launch point 203 by which user's initiate workspaces through the selection of managed data and resources. In various embodiments, launch point 203 may be an agent, application, special-purpose workspace or web portal the provides an interface by which a user may select from an aggregated collection of data sources, applications, calendars, messages or other managed information or resources that are available to the user of IHS 100 via operation of a workspace as described herein. In various embodiments, the launch point 203 may be provided in the form for textual, graphical and/or audio user interfaces that allow a user of IHS 100 to select available data and/or resources. In some embodiments, workspace hub 327 may utilize a local environment management module 328 in providing the workspace interface that is presented to the user on IHS 100 and doing so in a consistent manner across workspaces 331A-N. Workspace hub 327 may also include a local intelligence logic 329 used to support modeling the use of IHS 100 in order to improve characterization of the actual risk associated with a risk context. User authentication and access control operations may be performed by a local identity module 330 that may interface with trusted controller 341 in providing user authentication.

In some cases, each instantiated workspace 331A-N may be a logical environment that provides a user with access to requested data or applications, where the environment may operate using a computing architecture that may be isolated in varying degrees from the hardware and software of IHS 100 based on the security context and productivity context in which each workspace 331A-N is operating. In some instances, the selection of a data source or resource that are available to user via launch point 203 may result in launching a new workspace. For instance, if a user launches a browser through selection of an icon displayed by launch point 203, a new workspace may be created and launched according to a workspace definition that has been selected for providing the user access to a web browser in the security and productivity contexts in which the request has been made. In a scenario where the user double clicks on a confidential presentation file available from a data source that is provided by launch point 203, an additional workspace may be instantiated with a presentation application providing access to the requested presentation file, where this new workspace is created based on a workspace definition that provides appropriate security for accessing that particular confidential presentation on that particular IHS. In other instances, a selection of the presentation file by a user may result in the presentation being made available through the existing workspace, in some cases using the existing workspace definition and, in other cases, using a workspace definition that has been modified to support the requested access to the confidential presentation file.

Although workspaces 331A-N supported by IHS 330B may each be isolated to varying degrees from the hardware and/or software of IHS 100 and from each other, a user of IHS 330B may expect to be able to operate the multiple workspaces 331A-N in a manner that allows content to be transferred between the different workspaces 331A-N. For instance, a user may select a portion of the data displayed in workspace 331A and utilize OS or other workspace functions to copy the data for copying to workspace 331B.

In various embodiments, local management agent 332 may operate in full or in part on secure platform 345 hosted by trusted controller 341, such as described with regard to FIG. 1, that operates independent from the OS of IHS 100. In some embodiments, all or part of local management agent 332 may operate as trusted components of the OS of IHS 100. To execute the various operations described herein, local management agent 332 may include command monitor 334 configured to provide instrumentation to receive commands from workspace orchestration service 206 in support of the workspaces operating on the IHS. For instance, such commands supported by local management agent 332 may provide for a new workspace definition to be specified for an individual workspace 331A-N, such as through a new workspace definition that reconfigures use of existing IHS resources into a primary workspace and one or more subordinate workspaces, where the primary workspaces and each of the subordinate workspace all operate according to their own respective workspace definitions. In some embodiments, command monitor 334 may be reconfigured to interface with different workspace orchestration services in support of the ability to transfer orchestration of an individual workspace 331A-N between different workspace orchestration services. In some embodiments, command monitor 334 may be configured to interface with an remote orchestration service 206 that provides support for utilizing subordinate workspaces on peripheral devices 120A-H that are coupled to the IHS 100, and in particular, for supplementing a subordinate workspace topology with additional subordinate workspaces for use by peripheral devices that are not recognized by the IHS 100.

Local management agent 332 may also include telemetry module 335 that may be configured for communicating collected information to workspace orchestration service 206, including IHS resource availability and also including reporting changes in context that may warrant adjustments to workspaces 331A-N, including changes detected in peripheral devices coupled to IHS 100 and that may operate subordinate workspaces. Data aggregator 336 may track all of the data source and other resources (e.g., applications, local or cloud-based services) that may be provided to the user via a workspace.

Local management agent 332 may utilize resource manager module 337 that is configured to manage access to data, network configuration, such as for VPNs and network access, identity information, access control, and resource provisioning services. Security module 338 may be configured to provide various security services. BIOS interface 339 may provide a secure BIOS interface used for accessing and managing credentials in secure object storage. BIOS analytics module 340 may be configured to perform forensic services for BIOS telemetry and health assessments. Persistence module 346 may be configured to support persistence of applications entitled at a POS or assigned by administrators and supported with required license tracking. Workspace attestation module 333 may provide a platform centric service layer on top of a container engine provided by local management agent 332 and may be used to measure and attest workspaces 331A-N in any suitable manner defined or orchestrated by a condition control module 305 of a workspace orchestrator 206.

As part of secure platform 345, native management module 347 may be configured to enable an out-of-band management interface for interoperation with workspace orchestration service 206, where this OOB interface operates independent form the OS of IHS 100, as described with regard to FIG. 1. In some embodiments, the OOB management interface supported by native management module 347 may be utilized by the device configuration services 316 of the workspace orchestration service to access the secure platform services 345 of IHS 100, thus providing a reliable mechanism for a workspace orchestration service 206 to interface with an IHS 100, and more particularly to the resources of the IHS that are being used to operate workspaces 331A-N. In some embodiments, secure platform services 345 may be utilized in communicating with peripheral devices 120A-H that are coupled to IHS 100 in supporting the operation of subordinate workspaces on these peripheral devices.

Digital device ID module 348 may provide a unique, un-spoofable, cryptographically bound identifier. In embodiments supporting a secure platform 345, secure embedded controller 341 may be a hardened hardware module that may include a root of trust module 342 configured as a trusted data store and, in some cases for cryptographic processing, that may be trusted within a cryptographic system. A device attestation service 343 may be configured to perform device assurance and trust services (e.g., secure BIOS and secure boot, etc.). A secure object store 344 may be provided that is configured to lock and access keys, hashes, and/or other secrets in an EC and/or TPM.

In some scenarios, IHS 100 may be provisioned by a manufacturer that also controls manufacturer integration components 317, workspace attestation module 333 may operate in conjunction with secure object store 342, authenticated BIOS module 339, and/or digital device identity module 348, etc., to further secure and/or control productivity features available in any of workspaces 331A-N based upon hardware devices and settings unique to that IHS and/or designed specifically by that manufacturer.

To further illustrate how the systems and methods described herein operate to modernize workspace and hardware lifecycle management in an enterprise productivity ecosystem, three non-limiting use cases or examples are discussed in turn below.

Use Case A

In use case A, a user employed by an enterprise may request access to a protected data source while on the enterprise's premise and while using an enterprise-owned and configured notebook computer, which may be configured as described with regard to IHS 100 of FIG. 1 and client IHS 100 of FIG. 3B.

In response to the request, a local management agent 332 operating on the user's notebook retrieves information describing the current context in which the protected data will be accessed and calculates security and productivity targets based on the determined context information. In this use case, the local management agent may have been installed on the IHS by an IT administrator, and may operate as background service. When the user selects the protected data, such as via a launch point selection provided by the OS of the notebook, the local management agent notifies a workspace orchestration service provided by the enterprise of the request for access to the protected data. In response, workspace orchestration service of the enterprise generates a workspace definition for generating and operating a workspace on the IHS by which the user may be provided access to the protected data. One received at the IHS, the protected data may be restricted for access only by a specific workspace based on file classification (e.g., file metadata/type/properties/permissions, folder location, encrypted region, etc.). Throughout use of the protected data, the local management agent may collect context information, some or all of which may be sent to the orchestration service for use in updating the risk and productivity scores of the workspace.

In this example, the workspace orchestration service may determine the context to have an overall security risk of "2," in some instances using a weighed, machine learning, or artificial intelligence algorithm. This overall security risk of 2 may be based upon the locale (e.g., an enterprise locale with a lowest risk score of 1), user identity (e.g., a high-confidence identification of a sophisticated user, such as a known user with a history without significant security protocol violations has a low risk score of 2), network risk (e.g., a low risk score of 1 based on use of a wired network connection controlled by the enterprise), IHS risk (e.g., a risk score of 1 based on a high level of control of an enterprise owned/managed IHS that operates known software versions with security features enabled); regulatory risk (e.g., a risk score of 1 based on that lack of any regulatory restrictions on this particular data, such as restrictions with respect to General Data Protection Regulation or "GDPR," Health Insurance Portability and Accountability Act "HIPAA," Payment Card Industry "PCI," technology export regulation, etc.), and data type (e.g., a risk score of 8 based on the requested data being stored in a confidential datafile).

In evaluating the request, the workspace orchestration service may also calculate a productivity score of "9," also using a weighed, machine learning, or artificial intelligence algorithm. This productivity score of 9 may be based upon the locale (e.g., a score of 10 based on use of the data at a location of the enterprise), user identity (e.g., a score of 9 in light of a "skilled" classification of the user based on advanced compute tasks by the user, proficiency of the user, and/or speed of operation by the user), network speed/ latency (e.g., a score of 10 based on use of fast, wired, Gigabit Ethernet supported by the enterprise's internal network), IHS performance (e.g., a score of 8 base the speed of the CPU, expense of the CPU, memory availability, graphics processing capabilities, storage) and data type (e.g., a score of 10 based on the protected data being made available as a local file in protected memory that is easy to read/write with low latency and high performance on local storage).

In this example, the security target may have a score of "1," where this security target score of 1 may be based upon security requirements that are applicable for access to the protected data, such as: threat monitoring (e.g., a score of 1 based on minimal requirements being sufficient for accessing the protected data), threat detection (e.g., a score of 1 based on minimal requirements for use of anti-virus and/or malware detection capabilities), threat analytics (e.g., a score of 1 based on minimal requirements for use of machine learning threat detection tools), threat response (e.g., a score of 1 based on minimal remediation requirements in response to a detected threat), storage confidentiality (e.g., a score of 2 for low requirements for enhanced security protocols by the device of the IHS providing local storage of the protected data), storage integrity (e.g., a score of 2 based on low requirements for data redundancy by the IHS device providing local storage), network confidentiality (e.g., a score of 1 based on basic network security requirements), memory confidentiality (e.g., a score of 1 based on low memory security requirements), memory integrity (e.g., a score of 1 based on low requirements for validating the integrity of memory used to store protected data), display confidentiality (e.g., a score of 1 based on a lack of requirements for screen blurring or privacy screens when displaying the protected data), display integrity (e.g., a score of 1 based on a lack of requirements for validating the integrity of instructions used to display the protected data), user authentication (e.g., a score of 1 based on basic user authentication requirements, such as use of basic, single-factor password with no session expiration), IT administrator scope (e.g., a score of 1 based on ability for administrator manage remotely using whatever remediation tools are available), and regulatory compliance (e.g., a score of 1 based on a lack of any GDPR, HIPAA, PCI, or export restriction on the protected data).

Based upon the productivity target and/or context information, a productivity target score of "9" (i.e., corresponding to a high-quality and highly responsive user experience) may be determined for the workspace definition based upon a requirements such as: local storage: 7 (e.g., a workspace providing access to the protected data must have partial control of the storage device where the protected data will be locally stored), CPU access (e.g., a score of 10 based on requirement of unlimited CPU access), local graphics (e.g., a score of 10 based on a requirement of unlimited use of available GPU resources), and application stack (e.g., a score of 10 based on allowed use, installation and administration of an application used to access the protected data).

Based upon the collected security score and/or context information, the workspace orchestration service builds a workspace definition file having any suitable structure, with workspace definition attributes that are specified in a machine-readable format (e.g., JSON name-value, XML structured, etc.). Using attributes specified in the completed workspace definition, the workspace orchestration service and the local management agent may assemble the workspace and instantiate it for the user. For example, the local management agent may receive workspace definition files (e.g., JSON, XML, etc.) from the remote orchestration service, and may parse the received file to identify attributes for use in configuring an IHS for operation of a workspace, such as security settings to be enforced by the local management agent.

For example, a workspace definition may specify use of security protocols that specify: minimal threat monitoring (e.g., local management agent configures the workspace to operate without threat monitoring/detection), minimal threat analytics (e.g., local management agent gathers limited telemetry for threat analysis), no threat response (e.g., local management agent does not install security threat response agent), user-initiated storage confidentiality (e.g., local management agent deploys local file-system encryption that the user can optionally enable on specific files as needed, such as via right-click context menu selections), basic network confidentiality (e.g., local management agent confirms basic firewall configuration is correct), no display confidentiality requirements (e.g., local management agent confirms graphics drivers used by a workspace are installed, but privacy screen and camera are optionally managed by user), basic user authentication (e.g., local agent confirms use of basic password authentication with no session expirations), expansive IT administrator scope (e.g., local agent runs with system privileges); and no regulatory compliance (e.g., local agent does not configure use of compliance software by the workspace). After completing such configurations, the workspace orchestration service and the local management agent may give the user access to the requested local confidential file, and the user may begin working in a newly created workspace.

Use-Case B

In use-case B, a user requests access to a confidential datafile while at a coffee shop and while using an open public network and an IT-managed owned laptop IHS that is owned by the user's employer, and that is configured as described with regard to IHS 100 of FIG. 1 and client IHS 100 of FIG. 3B.

First, a local management agent 332 executed by user IHS 100 retrieves the requested context and calculates security and productivity scores based on context. In this use-case, the local management agent may have been installed on IHS 100 by a corporate IT administrator, and the local management agent may run as a background service during operation of IHS 100. The confidential data may be stored at a corporate premises on managed storage resource (e.g., in a main corporate data store), and the local management agent may monitor when this data path is requested by the user (e.g., the user request translates to a specific URL, IP, etc.). As described, the local management agent may continuously collect updates to the security and productivity context and send context updates to the workspace orchestration service, where the updated context information is used to generate updated security and productivity scores. When the user selects the confidential data file, the local management agent detects the request for the confidential datafile, such as based on information reported by the operating system of the IHS 100, and issues a request for a workspace definition from the remote workspace orchestration service 206.

In this example, the workspace orchestration service may determine the context to have an overall security risk of "4." This overall security risk of 4 may be based upon: locale (e.g., a score of 5 based on the request made from a public, but in a country that does not indicate inherent risk); user persona (e.g., a score of 5 based on the user being a new user), network risk (e.g., a score of 5 based on the request originating from a public but common wireless network), device risk (e.g., a score of 1 based on the request being made from corporate owned/managed platform using known version of firmware and software and with security features enabled), and regulatory (e.g., a score of 1 based on no GDPR, HIPAA, PCI, or export restriction on the protected data).

In evaluating the request, the workspace orchestration service may also calculate a productivity score of "5," based on: locale (e.g., a score of 6 based on the request originating from a remote location, but in a major US city, and the user is in a public area with non-employees within visual/audio range of the IHS), user persona (e.g., a score of 5 based on lack of specific user classification resulting in use of default persona settings), network speed/latency (e.g., a score of 4 based on use of a medium-speed and highly shared wireless network), and device performance (e.g., a score of 8 based on the IHS including a fast CPU with abundant memory and separate graphics processing capabilities).

Based upon the context and/or scoring information, the workspace orchestration service builds a workspace definition file. In this example, a security target of a value of "4" may be calculated based upon context information such as: threat monitoring (e.g., a score of 4 based on medium security requirements for accessing the protected data), threat detection (e.g., a score of 4 based on medium requirements for use of anti-virus and/or malware detection capabilities), threat analytics (e.g., a score of 4 based on medium requirements for use of machine learning threat detection tools), threat response (e.g., a score of 4 based on medium remediation requirements in response to a detected threat), storage confidentiality (e.g., a score of 4 based on medium requirements for enhanced security protocols by the device of the IHS providing local storage of the protected data), storage integrity (e.g., a score of 9 based on high requirements for data redundancy by the IHS device providing local storage), network confidentiality (e.g., a score of 5 based on medium network security requirements), memory confidentiality (e.g., a score of 4 based on medium memory security requirements), memory integrity (e.g., a score of 8 based on high requirements for validating the integrity of memory used to store protected data), display confidentiality (e.g., a score of 7 based on high concerns of "shoulder surfers" reading the protected data while the IHS is being used in a public location), display integrity (e.g., a score of 2 based on minimal requirements for validating the integrity of instructions used to display the protected data), user authentication (e.g., a score of 4 based on protected data use requiring use of two-factor authentication using a hardware token and session expiration upon sleep, screen lock, or logout), IT administration scope (e.g., a score of 3 based on ability for administrator to monitor, manage, and remediate remotely, as long as the user initiates the administration), and regulatory compliance (e.g., a score of 1 based on a lack of any GDPR, HIPAA, PCI, or export restriction on the protected data).

Based upon the productivity target and/or context information, a productivity target score of 7 (i.e., corresponding to a high-quality and responsive user experience with minimal lag) may be determined for the workspace definition based upon a requirements such as: local storage (e.g., a score of 7 based on requirement of a workspace providing access to the protected data must have partial control of the storage device where the protected data will be locally stored), CPU access (e.g., a score of 10 based on requirement of unlimited CPU access), local graphics (e.g., a score of 10 based on a requirement of unlimited use of available GPU resources), and application stack (e.g., a score of 7 based on allow use of applications used to access the protected data, but application installation is limited to IT-approved applications and the user has limited administrative rights).

Based upon the collected security score and/or context information, the workspace orchestration service builds a workspace definition file. For example, a workspace definition may specify use of security protocols that specify: medium threat monitoring (e.g., local management agent installs or confirms prior installation/configuration of threat monitoring/detection software), medium threat analytics (e.g., orchestration confirms telemetry is accessible and IHS logging capabilities are enabled), low threat response (e.g., local management agent downloads but does not run security threat response agent), medium storage confidentiality (e.g., local management agent deploys a local container technology, such as sandbox, with restricted "save" permissions such that the confidential files will not be allowed to save locally on the PC, but can be accessed as long as the session is active in memory), medium network confidentiality (e.g., local management agent enables firewall protections, disabling all unnecessary ports, and establishes a VPN to the orchestrator), medium memory confidentiality (e.g., local management agent configures sandbox container to isolate application and data from other applications/threats operating on the IHS), high display confidentiality (e.g., local management agent confirms graphics drivers are installed and are configured to enforce a privacy screen and use of camera is enabled for detecting onlooker threats), medium user authentication (e.g., local management agent confirms use of basic password authentication with no session expiration, but a requirement for hardware token is required to access the workspace), medium IT administrator scope: 4 (e.g., local agent runs with basis administrator and remote access privilege); and medium regulatory compliance (e.g., local management agent installs country-specific data confidentiality rules). After confirming the configuration, the workspace orchestration service and the local management agent may give the user access to the requested local confidential file, and the user may begin working in a newly created workspace.

Use-Case C

In use-case C, a user requests access to a confidential datafile from a web-hosted portal operating on a shared-use device that is located in a country with a high security risk, where the IHS may be configured as described with regard to IHS 100 of FIG. 1 and client IHS 100 of FIG. 3B, or that may be an untrusted device.

First, a remote workspace orchestration service 332 is notified of or detects the access request and evaluates the browser and user context, and calculates security and productivity scores. In this use-case, there is no local management agent operating on the device. Instead, the remote orchestration service configures operation of a workspace via the browser based on telemetry returned or garnered through the HTTP/S session. In this scenario, the confidential data may be stored at a corporate premises on managed storage resource (e.g., in a main corporate data store), and that data remains stored there with only remote rendering of the data by a browser-based workspace operating on the untrusted device, where context information used to configure and operate the workspace may be gathered through the browser session or supplied by the user. In some instances, user context may also be collected for the workspace orchestration service through alternate side-channels (e.g., travel calendar information, recent user billing activity on corporate credit card, phone call logs, and/or location data). When the user request access to the confidential data file, the workspace orchestration service detects the request, and generates a workspace definition for deployment and operation of a browser-based workspace.

In this example, the workspace orchestration service may determine the context to have an overall security risk of "9." This overall security risk of 9 may be based upon: locale (e.g., a risk score of 9 for operation of the device in a high risk country), user persona (e.g., a score of 1 since the user has been biometrically authenticated and is expected to be at the locale), network risk (e.g., a score of 9 based on the use of a public network in an untrusted location), device risk (e.g., a score of 9 based on near zero trust in the device) and regulatory (e.g., a score of 8 based on user, data, location combinations).

In evaluating the request, the workspace orchestration service may also calculate a productivity score of "5," based on: locale (e.g., a score of 3 based on device being in an hotel common area), user persona (e.g., a score of 9 based on user being authenticated with a high-confidence and the user's skilled classification—advanced compute tasks, proficiency, and speed), network speed/latency (e.g., a score of 3 based on low-speed wireless connection with a weak signal), and device performance (e.g., a score of 3 based on workspace operation via a browser).

Based upon the context and/or scoring information, the workspace orchestration service builds a workspace definition file. In this example, a security target of a value of "9" may be calculated based upon context information such as: threat monitoring (e.g., a score of 10 based high security requirements for accessing the protected data), threat detection (e.g., a score of 10 based on requirements for use of all available threat detection tools, even if limited in this scenario), threat analytics (e.g., a score of 10 based on requirement for workspace orchestration service to use all available tools to detect the session being compromised), threat response (e.g., a score of 10 based on requirement of immediate session termination upon the detection of any threat), storage confidentiality (e.g., a score of 10 based on highest requirements for enhanced security protocols by the workspace orchestration service in storing the protected data), network confidentiality (e.g., a score of 10 based on highest network security requirements to be utilized by the remote workspace orchestrator in configuring and operating the workspace), display confidentiality (e.g., a score of 10 based on high risk of onlookers in a public location), user authentication (e.g., a score of 10 based on requirement for three-factor authentication using login, hardware token, and biometric device, with session expiration and periodic refreshes), IT administrator scope (e.g., a score of 8 based on administrative capabilities for monitoring, managing, and remediating remotely based on user request) and regulatory compliance (e.g., a score of 10 based on requirement that all network traffic is securely monitored, including the protected data).

Based upon the productivity target and/or context information, a productivity target score of 3 (i.e., corresponding to a medium-quality user experience supporting minimal use of the protected data, and thus supporting limited productivity) may be determined for the workspace definition based upon a requirements such as: local storage (e.g., a score of 10 based on restriction that workspace data can only be cached by the device), CPU access (e.g., a score of 3 based on limited expectations of CPU access), local graphics (e.g., a score of 3 based on limited expectations of graphics configuration availability), and application stack (e.g., a score of 1 based on use of web-browser based workspace that only provides a display of protected data with no user inputs available to modify the data).

Based upon the collected security score and/or context information, the workspace orchestration service builds a workspace definition file. For example, a workspace definition may specify use of security protocols that specify: threat monitoring (e.g., workspace orchestration service utilizes all available threat monitoring/detection capabilities and all available security protocols supported by the browser are enabled), threat analytics (e.g., workspace orchestration service utilizes all available telemetry, including monitoring of user behavioral telemetry via side channels for suspicious/anomalous activity), threat response (e.g., workspace orchestration service utilizes all available terminates session upon any threat, or automatically without a successful periodic re-authentication of the user), storage confidentiality (e.g., workspace operates as a progressive web application that displays the data through a secure TLS link such that the data is rendered but with only as-needed portions of visualization presented to the user and with no capabilities to save the data), network confidentiality (e.g., workspace orchestration service utilizes all available route traffic through most secure network resources available and using most secure network protocols available), memory confidentiality (e.g., workspace is web page viewer only, without protected data leaving the data center and the workspace supports limited inputs from the device), display confidentiality (e.g., workspace utilizes confidentiality capabilities such as adjustable and variable font sizes, screen shifting and obfuscated text), user authentication (e.g., workspace orchestration service utilizes all available confirms use of multi-factor authentication, including biometric authentication), IT administrator scope (e.g., workspace orchestration service has full administrative capabilities). After confirming the configuration, the workspace orchestration service gives the user access to the requested local confidential file, and the user may begin use of the newly created workspace.

Figure 4:
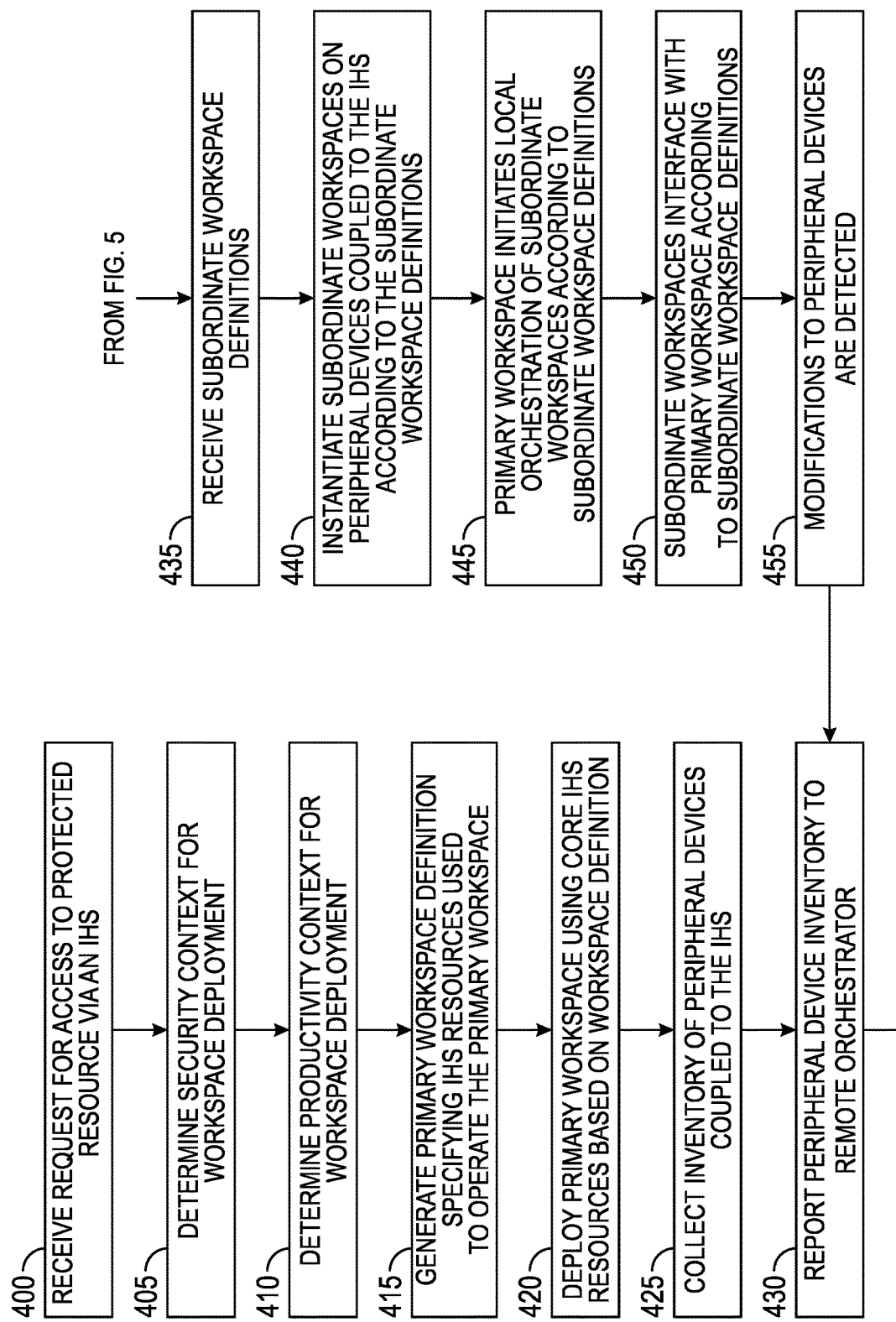
FIG. 4 is a flowchart diagram depicting certain steps of a method, according to various embodiments, for the operation of subordinate workspaces on peripheral devices that are coupled to an IHS.

FIG. 4 is a flowchart diagram depicting certain steps of a method, according to various embodiments, for the operation of subordinate workspaces on an IHS. Some embodiments may begin, at 400, with a user of an IHS that has been configured according to the embodiments described herein requesting access to a protected resource, where access to the protected resource will be provided to the user via a workspace that is hosted, at least in part, using the hardware and software resources the IHS. As described above, embodiments may support a launch point by which a user may initiate workspaces for accessing certain protected resources. Upon a user of an IHS initiating such request, a remote workspace orchestration service may be notified of the request and may respond by determining context information for the request. As described, in some instances, a user may operate an IHS using shared, public or otherwise untrusted peripheral devices 120A-H, such as in shared-use workstations available in corporate environments and in public facilities (e.g., hotels, airports, co-working spaces). Accordingly, in such instances, a user may request access to a protected resource upon initiating use of the IHS at this location.

Accordingly, at 405, the security context for the requested workspace deployment may be determined. As described above, a local management agent of the IHS may collect various types of information describing a security context for a workspace deployment on an IHS. For instance, the local management agent may collect information describing the user, the authentication status of the user, the security profile for the user, the geographic location of the IHS, whether the user is located in a public location, whether other individuals are detected in proximity to the IHS, the network in use by the IHS, the operating system of the IHS, authentication capabilities supported by the IHS, antivirus software in use by the IHS, whether the software in use by the IHS has been validated as authentic, peripheral devices coupled to the IHS and whether any of these are shared-use peripheral devices, peripheral devices that are detected in the vicinity of the IHS, etc. In some instances, the local management agent may also report an inventory of external peripheral devices 120A-H that are coupled to the IHS, as described in additional detail below. As described above, these various types of collected security context information may then be used to calculate a security score for the workspace deployment.

In a similar manner, at 410, the productivity context for the workspace deployment may also be determined based on collected information. As described above, the productivity context may include various productivity characteristics for a workspace deployment on an IHS, such as performance specifications of the IHS, user characteristics that are indicative of productivity, capabilities of the networks in use by the IHS, peripheral devices of the IHS that are available for use, productivity tools (e.g., speech recognition software) supported by the IHS, etc. As with the collected security context information, the productivity context may be used to generate a productivity score for the workspace deployment.

As described above, based on the security score and the productivity score for the workspace deployment, at 415, a workspace definition may be generated by the remote workspace orchestration service, where the workspace definition specifies the computing architecture for use in the operation of the workspace. For example, where a request is associated with elevated security score due to the request seeking access to highly protected data using an IHS that has recognized security vulnerabilities, the generated workspace definition may specify a computing architecture in which the workspace itself operates on a cloud resource, with only an image of the workspace output being displayed in a graphical user interface of the IHS. In another example where the request is associated with a lower security score due to fewer identified security vulnerabilities of the IHS, the workspace definition may specify a computing architecture in which the workspace operates as a virtual machine that is independent from the operating system of the IHS. In another example where the request is associated with a still lower security score due to the request seeking access to nonprotected data, the workspace definition may specify a computing architecture in which the workspace operates as a container supported by a web browser of the IHS.

In instances where the workspace being deployed is the first workspace to be initiated on the IHS, this workspace may be designated as a primary workspace, where the primary workspace may be used to support one or more subordinate workspace that operate on peripheral devices that are coupled to the IHS, as described below. As indicated in FIG. 4, at 420, this primary workspace is deployed on the IHS based on the workspace definition, where the computing architecture specified in the workspace definition may result in one of various different types of supported workspaces being deployed using computing architectures that utilize core hardware and software resources of the IHS to varying degrees. With the primary workspace deployed in this manner, the user may operate the primary workspace using the computing architecture specified in the workspace definition.

As described, malicious actors may seek to compromise a workspace in order to gain access to the protected data that is being provided via the workspace. Depending on the computing architecture selected for use by a workspace, different attack surfaces are presented, such that different computing architectures may present different types of vulnerabilities that could be exploited by malicious actors. Some computing architectures may provide greater levels of security than other architectures. In some embodiments, the computing architecture utilized by a primary workspace may be adjusted to utilize one or more subordinate workspaces that operate on peripheral devices that are coupled to the IHS. Through use of subordinate workspaces, embodiments may adjust the risk and productivity contexts of the primary workspace in a manner that improves the ability to securely provide the user with productive access to protected data via the primary workspace. In some embodiments, the risk and productivity of the primary workspace may be improved through the use of subordinate workspaces that allow primary workspace to operate peripheral devices, thus delineating that capabilities of the peripheral device that may be leveraged by the primary workspace and also defining the attack surface presented by interoperating with the peripheral device. As described, such capabilities may be especially advantageous in environments where an IHS is being coupled to untrusted peripheral devices, such as in shared-use workstations.

Accordingly, at 425, an inventory of peripheral devices that are coupled to the IHS is collected, such as external peripheral devices 120A-H described with regard to FIGS. 2A and 2B. In some embodiments, this inventory may be collected by the local management agent 332 operating on the IHS. In some embodiments, aspects of this inventory of peripheral devices may be additionally or alternatively collected through capabilities of the primary workspace, or by the remote orchestration service 206. As described with regard to FIGS. 2A and 2B, a variety of peripheral devices 120A-H may be coupled to an IHS 100, where these peripheral devices each include varying discrete logic and memory capabilities. Using these discrete computing capabilities of these peripheral devices 120A-H, embodiments may configure the logic and memory resources of peripheral devices for use in operating subordinate workspaces that function in support of the primary workspace.

As described, a workspace may operate using a variety of computing architectures, and thus using various computing resources of an IHS. In this same manner, a subordinate workspace may be configured to operate using the computing resources of a peripheral device that is coupled to the IHS. For instance, in a scenario where a peripheral device such as a display projector 120F or a display monitor 120G has been coupled to the IHS, embodiments may utilize the processing and memory capabilities of these display devices to operate a subordinate workspace that is distinct from the primary workspace operating on the core hardware resources of the IHS. Accordingly, the collected inventory of peripheral devices may include an inventory of detected computing resources of each of the external peripheral devices that are coupled to the IHS. Some peripheral devices may include minimal discrete computing capabilities, such as a keyboard 120B, earphones 120H or mouse 120D that include low-power microcontrollers and limited memory resources. Other peripheral devices may have more substantial computing capabilities, such as display monitors 120G and projection displays 120F that include complex PCBs with high-power controllers or other logic units, and that may include substantial memory resources. Some peripheral devices may include significant processing and memory resources, such as a virtual reality headset 120A or smartphone 120E that include a standalone processor with relatively large amounts of system memory, and that may include various sensors that provide user context information. The collected inventory of a peripheral devices may specify these types of computational and memory resources for each the peripheral devices of the IHS. In some embodiments, the collected inventory information may also specify firmware or other settings in use by each of the peripheral devices.

In some instances, certain peripheral devices coupled to an IHS may not support the operation of subordinate workspaces, whereas other peripheral devices may be specifically configured via firmware or other instructions for supporting the configuration and operation of subordinate workspaces, and may specify local processing and memory resources of the peripheral devices that are available for use by a subordinate workspace. Accordingly, in some embodiments, peripheral devices may respond to queries from the local management agent and/or from the primary workspace, thus indicating the peripheral device is configured to support a subordinate workspace. The collected inventory may thus specify whether each of the peripheral devices is already configured to support subordinate workspaces, and the resources that are available for use in the operation of subordinate workspaces.

As indicated in FIG. 4, at 430, this inventory of peripheral devices coupled to the IHS is transmitted to a remote orchestrator, such as described with regard to FIGS. 2 and 3A. In some instances, the inventory will be reported to the same remote orchestrator that provided the workspace definition of the primary workspace. However, as described, orchestration of a workspace may be transferred between remote orchestrators throughout the lifespan of the workspace. As such, the collected inventory of peripheral devices may be reported to a remote orchestrator that specializes in supporting the configuration of subordinate workspaces, or a remote orchestrator that specializes in providing use of particular protected data, such as an orchestrator that controls employee access to the employer's protected data.

Figure 5:
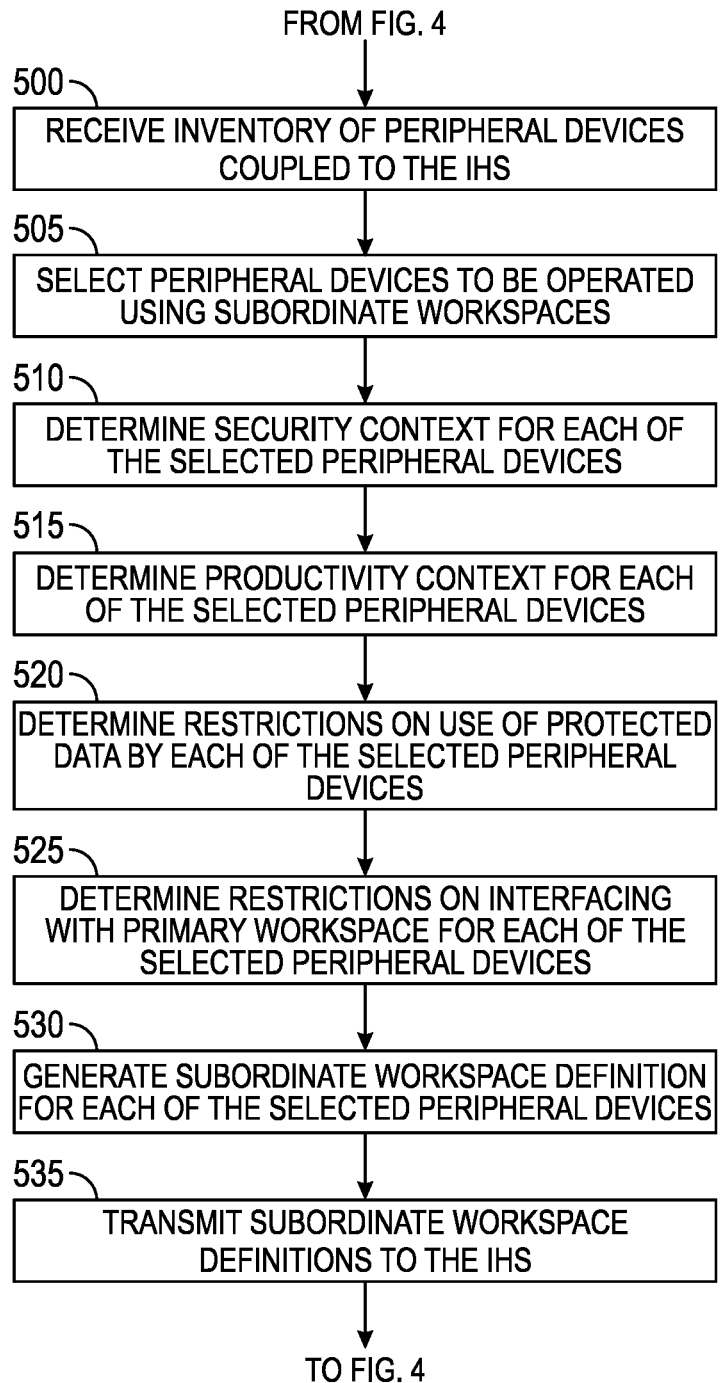
FIG. 5 is a flowchart diagram depicting certain steps of a method, according to various embodiments, for the configuration by a remote orchestrator of subordinate workspaces that operate on peripheral devices coupled to an IHS.

As indicated in FIG. 4, the collected inventory is reported to a remote orchestrator in a transition to FIG. 5, which is a flowchart diagram depicting certain steps of a method, according to various embodiments, for the configuration, by a remote orchestrator, of subordinate workspaces on peripheral devices coupled to an IHS. Embodiments may begin, at 500, with the remote orchestrator's receipt of the collected inventory of peripheral devices that are coupled to the IHS on which the primary workspace is operating. At 505, the orchestrator may select the peripheral devices that will be utilized to operate subordinate workspaces.

In some embodiments, the peripheral devices for use of subordinate workspaces may be selected based on the protected data that is being accessed and/or generated using the primary workspace. For instance, in a scenario where the protected data being accessed using the primary workspace is a document that includes proprietary technical data, all peripheral devices that will be used in the display and/or manipulation of this data will be selected for operation of subordinate workspaces. In some embodiments, the peripheral devices may be selected based on the hardware capabilities reported in the inventory for each of the peripheral devices. For instance, in a scenario where the protected data accessed by the primary workspace is streaming data, peripheral devices with minimal control logic may be omitted from consideration for subordinate workspaces on the basis that such devices lack sufficient processing resources to actually compromise streaming data. In some embodiments, all reported peripheral devices that are coupled to the IHS will be selected for operation using subordinate workspaces, even if some of these subordinate workspaces will be used only to effectively restrict or control the operation of a peripheral device, thus providing a capability for limiting these peripheral devices in a manner that improves the security context of the primary workspace.

Once the peripheral devices that will be used to operate subordinate workspaces have been selected, at 510, a security context is determined for each of the peripheral devices. In some embodiments, a variety of security context characteristics may be evaluated in order to determine a security score for the operation of a subordinate workspace by a particular peripheral device. Characteristics of a peripheral device that may be evaluated in determining a security score may include: hardware resources (e.g., types of processors, microcontrollers, memory, I/O ports) of the peripheral device, versions and types of firmware or other instructions used to operate the peripheral device, authentication of the firmware being used to operate the peripheral device, supported user authentication, supported power states, networking capabilities, and performance and security characteristics of these networking capabilities.

As with the primary workspace, at 515, the orchestrator determines a productivity context for the peripheral device. Examples of a productivity context information used to calculate a productivity score for a subordinate workspace may include: the types of data or data sources available to user 201, use of the protected data that is being used by the primary workspace, minimum latency for a subordinate workspace operating on the peripheral device, responsiveness of the peripheral device, productivity applications available for operation in the subordinate workspace, the ability to transfer data to and/or from the peripheral device via the subordinate workspace, the ability for the subordinate workspace to interface with other applications operating on the hardware of the peripheral device (i.e., degree of acceptable isolation of the subordinate workspace), etc. As in the orchestration of the primary workspace, the productivity and security scores for a subordinate workspace may also be based on or modified using behavioral analytics related to user 201, IHS 100 telemetry and/or environmental information (e.g., collected via sensors 112).

In some embodiments, at 520, for each of the peripheral devices that have been selected for operation of subordinate workspaces, the orchestrator may determine restrictions on use of the protected data by the peripheral device. Such restrictions may be based on the security and productivity contexts for the operation of a subordinate workspace on a peripheral device, such as based on the productivity and security scores that have been determined for operation of the subordinate workspaces. For instance, based on a high security score that has been assigned to an external camera 120C that operates with untrusted firmware, this peripheral device may be restricted in accessing protected data that is available within the primary workspace. In a scenario where the protected data being accessed via the primary workspace includes a presentation video and attached files that are referenced in the video, an external display monitor 120G may be allowed use of video data from the primary workspace, but is restricted from accessing other data related to the video, and in particular the attached files. In another example, in a scenario where a peripheral device is a head-mounted display (HMD) 120A used for virtual or augmented realty, access to protected data is granted, thus allowing the protected data to be viewed in the virtual reality session, but the protected data must be stored in a segregated memory area of a storage device of the HMD 120A, where the segregated memory is for exclusive use of the subordinate workspace.

The orchestrator may continue, at 525, in determining restrictions for each of the selected peripheral devices in interfacing with the primary workspace. For instance, the external camera 120C, described above, that operates with untrusted firmware may be restricted to interfacing with the primary workspace only to transmit video data captured by the camera to the primary workspace. The subordinate workspace may be restricted in this manner through the subordinate workspace definition specifying an API supported by the primary workspace, where this API only supports function calls that allow the camera 120C to transmit captured video data to the primary workspace. In such a scenario, the primary workspace may be able to query the camera for updated security and context information, but not support any other capability by which the camera can transmit data other than captured video data to the primary workspace. In the example of an external display monitor 120G used to view a presentation video, the monitor may be restricted from accessing protected data other than video data to be displayed, but the monitor may not be otherwise restricted from interfacing with the primary workspace, such as to report available buffering resources. In the example of an HMD 120A, the subordinate workspace on the HMD may be limited to primary workspace queries that are limited to support of an ongoing virtual reality session. Once that virtual reality session has been terminated, the subordinate workspace may continue operating on the HMD 120A, but the subordinate workspace may be restricted to receiving communications from the primary workspace, such as instructions for connecting the HMD to a new virtual reality session.

Embodiments may continue, at 530, with the orchestrator generating a subordinate workspace definition for the creation and operation of a subordinate workspace the operates on the hardware of a specific peripheral device of the IHS, where the ongoing operation of the subordinate workspace may be managed (i.e., orchestrated) by the primary workspace operating on the IHS. As with the primary workspace, a subordinate workspace definition specifies a collection of attributes that describe a workspace that may be assembled, created, and deployed in a manner that satisfies a security target and a productivity target in light of the security context and the productivity context in which the subordinate workspace is to be deployed. Whereas a primary workspace may be deployed using the core hardware of the IHS, each subordinate workspace operates using the more-limited hardware resources of a peripheral device.

A subordinate workspace definition may prescribe: hardware resources of the peripheral device to be utilized and firmware versions that must be used to operate these hardware resources, authentication requirements for operation of the peripheral device by user 201, isolation of the subordinate workspace from other software operating on the peripheral device, applications or programs to be installed for operation within the subordinate workspace, data sources that are available within the subordinate workspace and requirements for routing and/or storing that data, additional applications or programs that are installed and used in the subordinate workspace, security protocols to be enforced by the subordinate workspace and that modify the scope of the attack surface of the subordinate workspace, primary workspace APIs that are available for use by the subordinate workspace, reference measurements for use in validating the integrity of the subordinate workspace, etc. As above, the security target of a subordinate workspace refers to the attack surface presented by the subordinate workspace that is created and operated based on a subordinate workspace definition, while the term productivity target for a subordinate workspace generally refers to the productivity characteristics of a particular subordinate workspace definition.

As indicated in FIG. 5, at 535, the orchestrator transmits the generated subordinate workspace definition to the IHS. In some instances, the subordinate workspace definition is transmitted to the local management agent 332, described with regard to FIG. 3B, that operates on the IHS and that initiated and manages the primary workspace. In such instances, the subordinate workspace may then be instantiated by the local management agent in a manner that is isolated from the primary workspace that is already operating on the core hardware resources of the IHS. In some instances, the subordinate workspace definition is transmitted to the primary workspace that is operating on the IHS. In such instances, the subordinate workspace is instantiated through operations of the primary workspace. The orchestrator may select the local management agent for instantiation of some subordinate workspaces, such as in scenarios where a peripheral device of the IHS is not trusted, or is of limited trust, and thus has a low security score. Conversely, the orchestrator may select a primary workspace for instantiation of other subordinate workspaces, such as in scenarios where a peripheral device has a sufficiently high security score.

At 435 of FIG. 4, the subordinate workspace definition is received by the IHS component that will be instantiating the subordinate workspace. Using received subordinate workspace definitions, at 440, a subordinate workspace is instantiated on the hardware resources of each of the selected peripheral devices of the IHS, where some of the subordinate workspaces may be instantiated by the local management agent and others by the primary workspace. Regardless of whether the subordinate workspace is instantiated by the local management or the primary workspace, at 445, the primary workspace initiates local orchestration of all of the subordinate workspaces that are operating on the IHS. In some embodiments, the primary workspace may operate as the local orchestrator for all subordinate workspaces of an IHS in the same manner in which a remote orchestrator manages primary workspaces, as described above.

Accordingly, at 450, the primary workspace interoperates with each of the subordinate workspace, where the communications supported by each subordinate workspace is specified in its subordinate workspace definition. As part of this orchestration, the primary workspace monitors each of the subordinate workspaces for reports of changes in the operating context of a respective peripheral devices. As in the orchestration of primary workspaces by the remote orchestrator, the primary workspace evaluates the suitability of the current subordinate workspace definition in light of any detected changes to the security or productivity context that characterize the peripheral device. In particular, the primary workspace determines updated security and productivity scores for a peripheral device based on updated security and productivity context information. At 455, once the security score or a productivity score for a subordinate workspace no longer satisfy the corresponding security or productivity target, the primary workspace may initiate the updating of the existing subordinate workspace or termination of the subordinate workspace, and a possible generation of a new subordinate workspace definition for generating a new subordinate workspace that will operate on the hardware of the peripheral device.

It should be understood that various operations described herein may be implemented in software executed by processing circuitry, hardware, or a combination thereof. The order in which each operation of a given method is performed may be changed, and various operations may be added, reordered, combined, omitted, modified, etc. It is intended that the invention(s) described herein embrace all such modifications and changes and, accordingly, the above description should be regarded in an illustrative rather than a restrictive sense.

The terms "tangible" and "non-transitory," as used herein, are intended to describe a computer-readable storage medium (or "memory") excluding propagating electromagnetic signals; but are not intended to otherwise limit the type of physical computer-readable storage device that is encompassed by the phrase computer-readable medium or memory. For instance, the terms "non-transitory computer readable medium" or "tangible memory" are intended to encompass types of storage devices that do not necessarily store information permanently, including, for example, RAM. Program instructions and data stored on a tangible computer-accessible storage medium in non-transitory form may afterwards be transmitted by transmission media or signals such as electrical, electromagnetic, or digital signals, which may be conveyed via a communication medium such as a network and/or a wireless link.

Unless stated otherwise, terms such as "first" and "second" are used to arbitrarily distinguish between the elements such terms describe. Thus, these terms are not necessarily intended to indicate temporal or other prioritization of such elements. The terms "coupled" or "operably coupled" are defined as connected, although not necessarily directly, and not necessarily mechanically. The terms "a" and "an" are defined as one or more unless stated otherwise. The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. As a result, a system, device, or apparatus that "comprises," "has," "includes" or "contains" one or more elements possesses those one or more elements but is not limited to possessing only those one or more elements. Similarly, a method or process that "comprises," "has," "includes" or "contains" one or more operations possesses those one or more operations but is not limited to possessing only those one or more operations.

Although the invention(s) is/are described herein with reference to specific embodiments, various modifications and changes can be made without departing from the scope of the present invention(s), as set forth in the claims below. Accordingly, the specification and figures are to be regarded in an illustrative rather than a restrictive sense, and all such modifications are intended to be included within the scope of the present invention(s). Any benefits, advantages, or solutions to problems that are described herein with regard to specific embodiments are not intended to be construed as a critical, required, or essential feature or element of any or all the claims.

The invention claimed is:

1. An Information Handling System (IHS) comprising:
a processor; and
a memory coupled to the processor, the memory having program instructions stored thereon that, upon execution, cause the processor to:
receive a primary workspace definition from a remote orchestrator;
instantiate a primary workspace based upon the primary workspace definition, wherein the instantiated primary workspace provides access to a protected resource;
report, to the remote orchestrator, an inventory of peripheral devices that are coupled to the IHS;
receive a plurality of subordinate workspace definitions from the remote orchestrator, wherein each of the subordinate workspace definitions are for operation of a subordinate workspace by one of the peripheral devices coupled to the IHS; and
based on the received subordinate workspace definitions, initiate operation of a plurality of subordinate workspaces on peripheral devices coupled to the IHS.

2. The IHS of claim 1, wherein the primary workspace is instantiated to operate using one or more CPUs and system memory of the IHS.

3. The IHS of claim 2, wherein, upon being initiated, each of the subordinate workspaces are instantiated for operation using logic and memory resources of a respective peripheral device.

4. The IHS of claim 1, wherein each of the subordinate workspace definitions specify restrictions on the operation of a respective peripheral device that is coupled to the IHS.

5. The IHS of claim 4, wherein the restrictions prohibit operations by a peripheral device with respect to the protected data.

6. The IHS of claim 5, wherein the restrictions prohibit a peripheral device from modifying the protected data.

7. The IHS of claim 5, wherein the restrictions prohibit a peripheral device from accessing the protected data.

8. The IHS of claim 5, wherein the restrictions prohibit a peripheral device from operations other than display of the protected data.

9. The IHS of claim 4, wherein the restrictions specify allowed communications by a peripheral device with the primary workspace.

10. The IHS of claim 9, wherein the allowed communications are specified by an API of supported communications between a peripheral device and the primary workspace.

11. The IHS of claim 4, wherein the restrictions on the operation of a respective peripheral device are selected based on a security score of the peripheral device.

12. The IHS of claim 11, wherein the restrictions prohibited all communications between a first peripheral device and the primary workspace based on a security score above a threshold for the first peripheral device.

13. The IHS of claim 1, wherein initiating operation of the plurality subordinate workspaces on peripheral devices coupled to the IHS modifies a security score of the primary workspace.

14. A method for supporting workspaces on an Information Handling System (IHS), the method comprising:
receiving a primary workspace definition from a remote orchestrator;

instantiating a primary workspace on the IHS based upon the primary workspace definition, wherein the instantiated primary workspace provides access to a protected resource;

reporting, to the remote orchestrator, an inventory of peripheral devices that are coupled to the IHS;

receiving a plurality of subordinate workspace definitions from the remote orchestrator, wherein each of the subordinate workspace definitions are for operation of a subordinate workspace by one of the peripheral devices coupled to the IHS; and based on the received subordinate workspace definitions, initiating operation of a plurality of subordinate workspaces on peripheral devices coupled to the IHS.

15. The method of claim 14, wherein the primary workspace is instantiated to operate using one or more CPUs and system memory of the IHS.

16. The method of claim 15, wherein, upon being initiated, each of the subordinate workspaces are instantiated for operation using logic and memory resources of a respective peripheral device.

17. The method of claim 15, wherein each of the subordinate workspace definitions specify restrictions on the operation of a respective peripheral device that is coupled to the IHS.

18. The method of claim 17, wherein the restrictions prohibit operations by a peripheral device with respect to the protected data.

19. The method of claim 17, wherein the restrictions specify allowed communications by a peripheral device with the primary workspace.

20. A memory storage device having program instructions stored thereon that, upon execution by an Information Handling System (IHS), cause the IHS to:

receive a primary workspace definition from a remote orchestrator;

instantiate a primary workspace based upon the primary workspace definition, wherein the instantiated primary workspace provides access to a protected resource;

report, to the remote orchestrator, an inventory of peripheral devices that are coupled to the IHS;

receive a plurality of subordinate workspace definitions from the remote orchestrator, wherein each of the subordinate workspace definitions are for operation of a subordinate workspace by one of the peripheral devices coupled to the IHS; and based on the received subordinate workspace definitions, initiate operation of a plurality of subordinate workspaces on peripheral devices coupled to the IHS.

* * * * *